CODE CALL

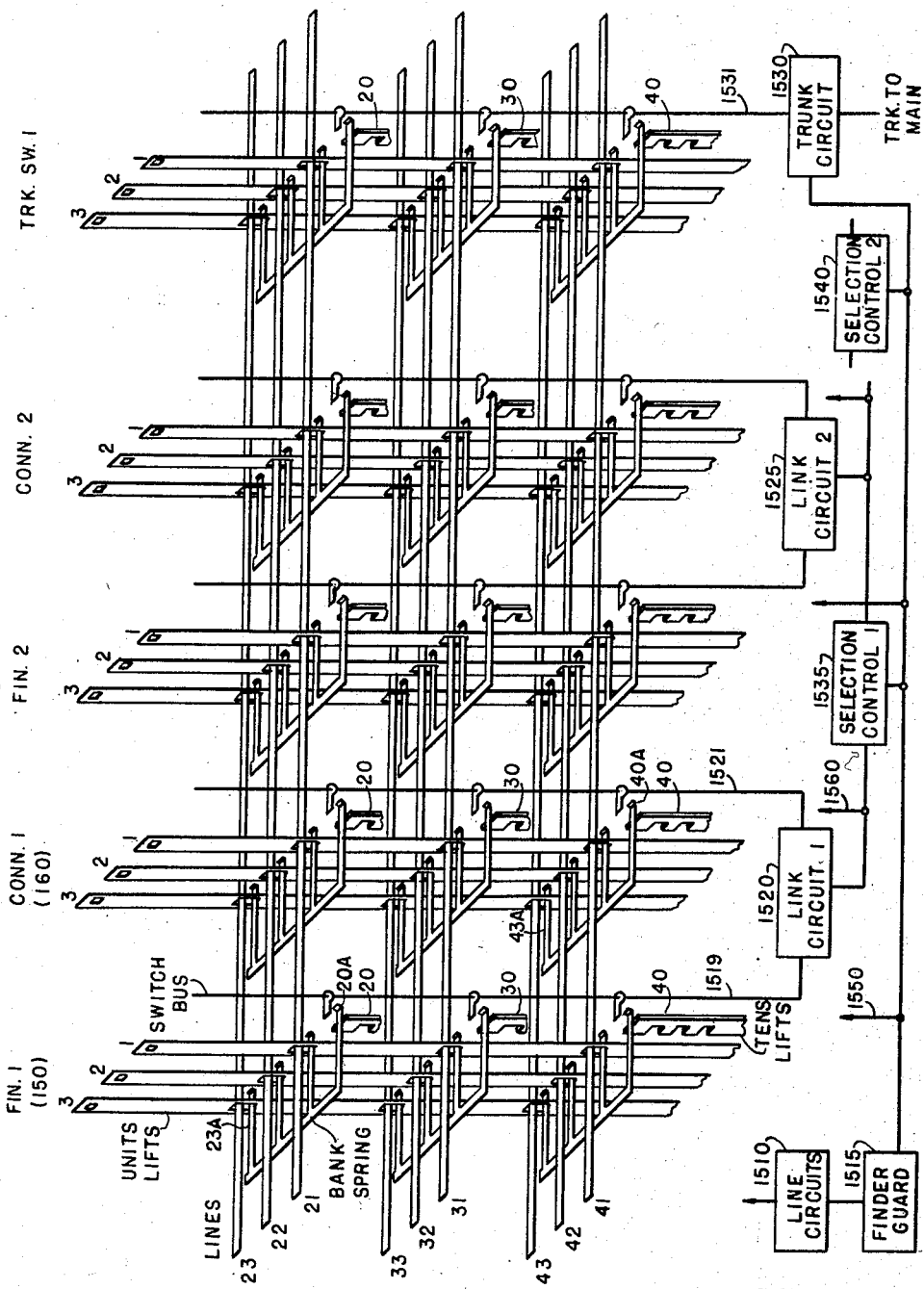

2,907,832

CROSSBAR RELAY PRIVATE BRANCH EXCHANGE TELEPHONE SYSTEM

Hans P. Boswau, Los Altos, Calif., and Robert V. Oldham and Harry G. Evers, Genoa, Ill., assignors to Leich Electric Company, Genoa, Ill., a corporation of Illinois Application February 28, 1957, Serial No. 643,165

26 Claims. (Cl. 179—22)

This invention relates in general to automatic telephone systems, and especially to a small system of the automatic private branch exchange type commonly referred to as a "P.A.B.X." It is particularly concerned with the use in such a system of a novel crossbar switch of the type disclosed in Patent 2,573,889, issued to Hans P. Boswau on November 6, 1951. The application of such a switch to an expansible 100-line automatic switchboard is covered by Patent 2,714,628, also issued to Hans P. Boswau on August 2, 1955.

The system here disclosed is assumed to be a 40-line system, with up to ten trunks to a main exchange, but the disclosure is not meant to be limited to any specific number of lines or trunks. An attendant's turret may or may not be provided, depending on the likely number of trunk calls, but the attendant's turret and its associated equipment have been omitted from the drawings, to avoid unnecessary complexity. Other optional features, such as conference call and tie-line equipment, have also been omitted.

One object of the invention is accordingly the adaptation of this type of switch for use in a small private branch exchange of this class, which is required to provide a number of services not used, for example, in a main exchange, nor even in a larger branch exchange.

Another object of the invention is the provision of specific circuits for use with these switches whereby they may be enabled to render the required services easily and conveniently.

A feature of the invention is the means provided whereby a local station can make an outgoing trunk call, or answer an incoming trunk call, by dialing a single digit to a local link, whereupon the local link automatically transfers the local station to a trunk switch, which then completes the connection and releases the link.

Another feature of the invention is the means provided whereby a local station occupied with a trunk call, either outgoing or incoming may, without any special equipment at such station, make information calls to other local stations without releasing the trunk, or transfer such trunk call to another local station.

A further feature of the invention is the means provided for making and answering code calls by dialing through the regular local links, without the use of special switches as for trunk calls.

Other objects and features of the invention will become apparent upon perusal of the following description, when considered together with the accompanying drawings, comprising Figs. 1 to 15 inclusive, which show, in circuit diagram form, sufficient of the equipment of a small private exchange embodying the invention to enable the same to be readily described and understood.

Figs. 13 and 14 illustrate how the different figures of the circuit diagram are to be associated with one another while tracing the circuit operations. For the description of the code call circuits, Figs. 10 to 12 of Fig. 14 may be considered as occupying the space corresponding to that occupied by Figs. 7 to 9 in Fig. 13.

Fig. 15 is a schematic diagram showing the basic selection scheme of the system and corresponds generally to Fig. 8 of the aforementioned Boswau Patent 2,573,889.

Figure 1:
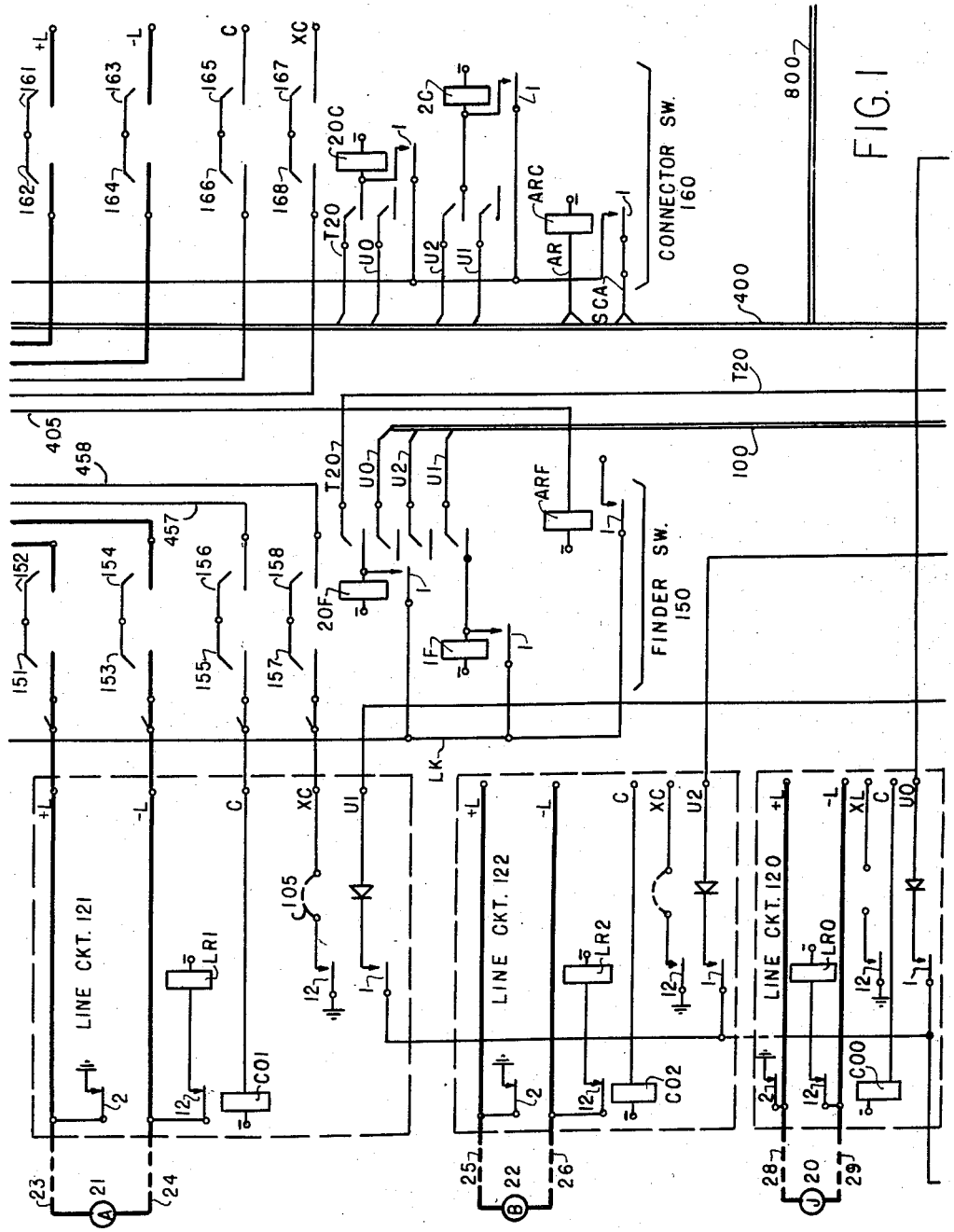
Fig. 1 shows a group of line circuits at the left, and at the right, portions of a finder switch 150 and an associated connector switch 160.

The general switching scheme will be considered first, with particular reference to Fig. 15, which shows in diagrammatic form, a portion of two finder switches, two connector switches, and a trunk switch, together with a representation, in block diagram form, of the various units of relay equipment associated with these switches.

The crossbar switches, whether used as finders, connectors or trunk switches, are all of identical construction, and may be used interchangeably. Each switch is flat and rectangular in form with a row of tens selecting magnets along the vertical front edge of the switch. In a horizontal row across the top of the switch from front to rear, is a row of five units selecting magnets, while across the bottom of the switch is a similar row of five units magnets, together with an allotter magnet at the rear of the row. These tens and units magnets which are not shown in Fig. 15, are similar to those shown in Figs. 2 and 6 of Patent 2,573,889, but their functions are reversed, since in the said patent the magnets at the front of the switch act as units magnets while those at the top and bottom serve as tens magnets. In the present disclosure also, only six tens magnets are provided in the vertical row along the front edge of each switch reducing its total length from some 16 inches to approximately 12, while the width of some 7 inches and thickness of about 1⅜ inches remain unchanged.

The line bank conductors of the system consist of stainless steel bars, each supported and separated from the others by perforated "Bakelite" guide blocks on each switch which enable the bars to be threaded through corresponding rows of openings in a row of switches mounted side by side. Four bars are provided for each line, two for the two line leads, one for the test lead, and one of an extra-control lead used for restricted service. Phosphor bronze bank springs, one for each horizontal row of bars, run horizontally across each switch, and are provided with ten projecting contact fingers for engaging each line bar of the row, plus an eleventh finger for engaging one of a group of four fixed contacts connected to a 4-wire switch bus leading to a link or a trunk.

At the upper left in Fig. 15, one of the horizontal rows of line bars is indicated at 21, 22, 23, with only one bar of each set of four actually shown, and the last seven sets of bars omitted. Directly below the bar 21, is one of the Phosphor bronze bank springs, with three of its line bar contact fingers shown, in addition to the eleventh or switch bus finger 20–A shown at the near end, the line fingers being controlled by corresponding units lifts also partially indicated at the upper left at 1, 2, 3.

In the present disclosure, these units lifts each consist of a light metal channel which serves as a frame for an insert of insulating material apertured in correspondence with the vertical rows of apertures in the "Bakelite" guide blocks. They are mounted in a vertical row across the contact side of the switch, with each lift suspended for free movement up or down between a projection on the armature of one of the units magnets inserted in a hole in one end of the lift and a leaf type restoring spring and guide inserted in a hole in the other end of the lift. In the complete assembly, one of the line bars and a corresponding one of the contact spring fingers project through each aperture of each lift, so that when any units magnet is operated, all of the contact fingers of the corresponding vertical row are moved by the lift into contact with the corresponding line bars of the row. As in Patent 2,573,889, half of the units lifts are arranged for upward movement and one half for downward movement to permit closer spacing. Also as in Patent 2,573,889 an allotter lift and an allotter magnet are provided at the rear of said vertical row at the back edge of each switch, for bringing isolated pairs of contact fingers into engagement with corresponding pairs of allotter bars, to connect the tens and units magnets of the switch to the tens and units marking leads in the control equipment, which is apart from the switches. This "allotter bank" as it is called, is not shown in Fig. 15 since its construction and operation are obvious in view of the foregoing description.

Each switch is also provided with six tens lifts, three of which are indicated in the left switch of Fig. 15 at 20, 30, 40, and also in the other switches as shown. Each of these tens lifts consists of a tooth-edged block of insulating material mounted on an armature arm controlled by one of the tens magnets mounted vertically along the front edge of the switch. Operation of any tens lift operates the corresponding four switch-bus contact fingers into engagement with the fixed contacts of the switch bus. This causes the corresponding horizontal rows of line contact fingers to be connected also to the switch bus, since they are a part of the same bank spring as the bus finger.

Thus, when any tens lift is operated, all of the line contact fingers of the corresponding tens group of lines are connected to the switch bus. Then, when a units lift is operated, all of the units fingers of the corresponding vertical row are brought into contact with the corresponding line bars of each tens group. But, since only one tens lift is operated, only the one line in the one tens group is actually connected to the switch bus. If tens lift 20 and units lift 1 are operated, for example, only the four line bars 21 will be connected to the bus, and if tens lift 30 and units lift 3 are operated, only the four line bars 33 will be connected to the bus.

For convenience, the finders and connectors are mounted in pairs, side by side, as indicated in Fig. 15. It will be seen that no line-multiple wiring is required between switches, since the line bars serve this purpose. It will also be noted that the first tens group is group 20. This is to avoid the use of a first digit "1" in a call number, in accordance with usual practice. The remaining line groups are the tens groups 30, 40 and 50, making four line groups of ten each. The fifth and sixth groups of bars form the tens groups 60 and 70, which together with group 50, do not appear in Fig. 15. The last two groups of line bars 60 and 70 are not connected to any subscriber lines, but do provide a bank multiple which is utilized for special service calls such as trunk calls, code calls and the like, which make use of a single digit call number.

*General method of operation*

The general method of operation, which can be readily followed in Fig. 15, is as follows.

Upon the initiation of a call at a local station, the corresponding line circuit, assumed to be included in the rectangle 1510 at the lower left in Fig. 15, seizes the common finder guard circuit 1515. The finder guard circuit, in turn, seizes the first available one of the two selection controls. The selection control then seizes a preselected free one of the three links assigned to its control. Let it be assumed for example that the first selection control, indicated by the rectangle 1535, which has access to the first three links, has been seized, and that it has in turn seized the first link circuit 1520.

Upon the seizure of the link 1520, the finder guard and link cause the operation of the allotter magnet in the first finder, which thereupon connects all of the tens and units magnets therein to their respective allotter bars. The finder guard then causes the operation of the finder tens and units magnets corresponding to the calling line, by way of the cable 1550 and the respective allotter bars. Thus, if line 23 is the calling line, tens lift 20 and units lift 3 would be operated. The four line bars 23 would thereupon be connected to the switch bus cable 1519 leading to the link circuit 1520. This connects the calling line to a pulsing and battery-feed relay in the link, after which the finder allotter magnet releases, and leaves the operated tens and units magnets locked independently to the link circuit.

The selection control then returns dial tone by way of the link, and the calling party dials. The link pulsing relay responds, and repeats the pulses to a small group of five counting relays in the selection control. At the conclusion of the first digit, the selection control operates the connector allotter magnet and the appropriate tens magnet, over the cable 1560. The allotter magnet and the counting relays then release, in readiness for the second digit. At the conclusion of the second digit, the selection control re-operates the allotter magnet and the appropriate units magnet of the connector, to complete the connection to the called line. The selection control then frees itself from the link, which maintains the various tens and units relays locked operated until the call is terminated and both parties have hung up.

To trace such a connection in Fig. 15, let it be assumed for example, that the foregoing call was to line 43, and that the tens lift 40 and the units lift 3 of the connector have been operated, in response to the digits "43." The line bank bars 23 of the calling line are now connected by way of the line contact fingers 23–A and switch bus contact fingers 20–A to the finder switch bus 1519 and thence through the link circuit 1520 to the connector switch bus 1521, from where the connection passes through the connector switch bus contact fingers 40–A and the line contact fingers 43–A to the line bank bars 43. The line 23 is therefore now connected to the line 43, through the line bank multiple, as indicated.

The trunk switches, one of which is provided for each trunk, are associated with the line bank bars in the same manner as the other switches, so that, in principle, any trunk may be connected to any line, and any line may be connected to any trunk. These trunks are provided with chain circuits which pre-select the free trunks for use in rotation for use on outward calls.

An outward trunk call starts in the same manner as a local call, but only one digit is dialed to the selection-control counting relays. The counting relays do not now operate the connector of the calling local link, but instead cause the seizure of the pre-selected trunk circuit such as 1530 indicated at the lower right in Fig. 15. The selected trunk circuit then causes the operation of the allotter magnet of the associated trunk switch and causes the re-operation of the finder allotter magnet of the calling link. The operated tens and units magnets of the finder thereupon pass their locking ground back over the allotter bank multiple to the corresponding tens and units magnets of the selected trunk switch. These magnets then operate and lock, and connect the trunk to the calling line bars, by way of the switch bus 1531. The trunk circuit then releases the local link and the selection control. The answering of trunk calls is accomplished in a similar manner.

A local party engaged in a trunk call, who wishes to obtain information or advice from another local party, may do so without releasing the trunk call, in a very simple manner, by momentarily depressing the telephone hookswitch and then dialing the number of the wanted party. The operation of the hookswitch causes the trunk to be held, and to first switch the local party to a local link, by way of one of the extra bank multiples in the tens groups 60 or 70. The trunk accordingly operates the corresponding tens and units magnets in the finder of the selected link, after operating the finder and trunk switch allotter magnets. Dial tone is then returned from the selection control, and the call number of the wanted station is dialed, and the connector of the seized link completes the connection in the usual way. To return to the trunk, the hookswitch is again depressed momentarily. This causes the trunk to re-connect the original station to the trunk, and to release the link.

Trunk calls are transferred from one local station to another in an equally simple manner. After making a "callback," as described in the preceding paragraph to establish connection with the second local party, the first party hangs up, while the second party remains on the connection. The trunk circuit then releases the operated tens and units magnets of the trunk switch, and then re-operates the allotter magnet of the trunk switch, as well as that in the connector switch of the link used in the "call-back," which is now held by the second station. The operated tens and units magnets of the connector thereupon mark the corresponding tens and units leads, and thereby cause the operation of the corresponding tens and units magnets in the trunk switch. This connects the second station to the trunk by way of the trunk switch, and the local link is then released.

A code call, like a trunk call, starts out like a local call, but again only one digit is dialed, which may be any unassigned one of the digits "6" to "0." The selection control counting relays now however, in response to this digit, cause the connector switch of the link involved in the call to seize the code call equipment over one of the extra bank multiples in the tens group 70 for example. A two-digit code number, which may or may not correspond with the phone number of the party to be paged, is then dialed to the code call equipment, which causes various signal bells or other audible signals to repeat this code. The code call may be answered from any station, by dialing a pre-assigned two-digit number. The connection is then extended over the regular line bank multiple, and through the code call unit to the calling line.

The general method of operation has now been outlined. A more complete understanding of the details of the operation and arrangement may be obtained from the following detailed description of the various circuit functions of the equipment, with particular reference to the Figures 1 to 12 inclusive.

*Local calls*

Let it be assumed that the subscriber A, at the local station 21 in Fig. 1, wishes to make a call to subscriber B at the telephone station 22. Upon removal of the handset, not shown, at station 21, the line is closed in the usual way, by the usual hookswitch, not shown. This causes operation of the associated line relay LR1 at the switchboard, over the calling line, from ground through contacts CO1-2 and CO1-12 of the line cutoff relay.

Upon operation of line relay LR1, contacts LR1-1 thereof complete a circuit for operating the tens and units marking relays T2 and U16 of the guard circuit, in series, as follows: ground through the lower break contacts of relay TG at the left in Fig. 3, cable 200, upper winding of relay U16, contacts LR1-1, winding of T2, cable 250, upper break contacts of TG, and contact TA-13 to battery through resistance RL. Relay TA is normally held operated through resistance 301.

Relays T2 and U16 disconnect the other T and U relays of the guard circuit, and at contacts T2-2 and U16-2 prepare a locking circuit in series with relay LO, now shunted by ground on both sides of its winding. At the same time, contacts T2-14 and U16-8 prepare circuits for the finder tens and units magnets, while contacts T2-11 and U16-11 close a direct circuit to relays TG and TH of Fig. 3 in series.

Relays TG and TH operate in this circuit, and open the operate circuit of relays T2 and U16. This removes the shunting ground from relay LO, and the latter relay operates in series with T2 and U16, and locks these relays operated as follows: ground, HI-6, winding LO, TB-5, U16-2, upper winding U16, LR1, winding T2, T2-2, TB-2, and TA-13 to resistance battery RL.

Relay LO, associated with the units values 1 to 5, is made slightly sluggish, but when it operates, its contacts LO-6 prepare a locking circuit for relay TU, and disable relay HI, associated with the units values 5 to 0. Contacts LO-6 at the same time complete a chain circuit for relay TU as follows: ground, LO-6, AG-2, lead FC-L to the last trunk not shown, through contacts corresponding to MG-16 and S-2 of Fig. 8 in said last trunk, through similar contacts in the other trunks, in series, wire FC-2 to the upper right corner of Fig. 8, contacts MG-16 and S-2 of the first trunk, lead FB-1 through cables 800 and 400 to the top of Fig. 4, contacts CH-16 in the 2nd selection control, contacts CX-11 in the 1st selection control alone or in parallel with CX-11 of the 2nd selection control depending upon the busy or idle condition of the latter, contact CH-16 in Fig. 5, lead FB through cables 500, 600 and 400 to Fig. 3, and the upper winding of relay TU to battery.

Relay TU upon operating, at TU-11 locks to LO-6, at TU-6 and TU-8 prepares operate circuits for the finder tens and units magnets, at TU-13 closes a hold circuit for relays TG and TH, at TU-15 connects a normally ineffective shunting ground to relay TA, and at TU-2 disconnects RL resistance battery on the GI-GO leads through the selection controls and the trunks from the GS lead to the same circuits to prevent their interference in the present selection. This GI-GO circuit, over which trunk reset guard relay TRG is normally held operated, may be traced as follows: battery, RL resistance, TA-13, lead GI through the cables 400, 600 and 500, CG-4 in the first selection control, lead GO to the second selection control, contacts CG-4 in the second selection control, lead GI1 to Fig. 8 of the first trunk, MG-2, S-12, lead GO1 to the next trunk, through other contacts MG-2 and S-12 in the other trunks, and back over lead GO-L to Fig. 3, and through TU-2 and AG-12 to resistance ground through the winding of TRG. Relay TRG accordingly restores and removes reset ground from the trunks.

Relay TU finally, at TU-4 disconnects ground from the link reset lead RS, and connects it to the finder start lead FA, to seize the first idle selection control and link. Assuming all six links and both selection controls idle and selection control relays CX, LX1, LX2 and LX3 operated, relay 4C of the first link will now operate in the following circuit: ground, TU-4, TA-11, lead FA, cable 400, CX-4, LX1-15, and the lower winding of 4C to battery. Relays CX and LX1 hold in this circuit over CX-4 and LX1-12.

Relay 4C upon operating, at 4C-1 extends this same ground to pulsing relay 4A in the link, and to allotter magnet ARF in the associated finder switch, in parallel. The circuit for ARF goes direct from 4C-1 over lead 405, while the circuit to 4A passes from 4C-1 through rectifier 406 and contacts L-14 to battery through the lower winding of 4A. Relay 4A upon operating in this circuit prepares circuits for 4B, while allotter magnet ARF connects the finder tens and units magnets to the guard circuit, thereby enabling the latter to operate the marked magnets 20F and 1F. The tens circuit is from battery through 20F and the appropriate allotter bank contact of ARF, lead T20, T2–14, TA–1, and TU–6 to ground. The units circuit is from battery through 1F and the corresponding allotter bank contact of ARF, lead U1 in cable 100 to Fig. 3, contacts LO–1, cable 300, U16–8, TA–3, and TU–8 to ground.

Figure 3:
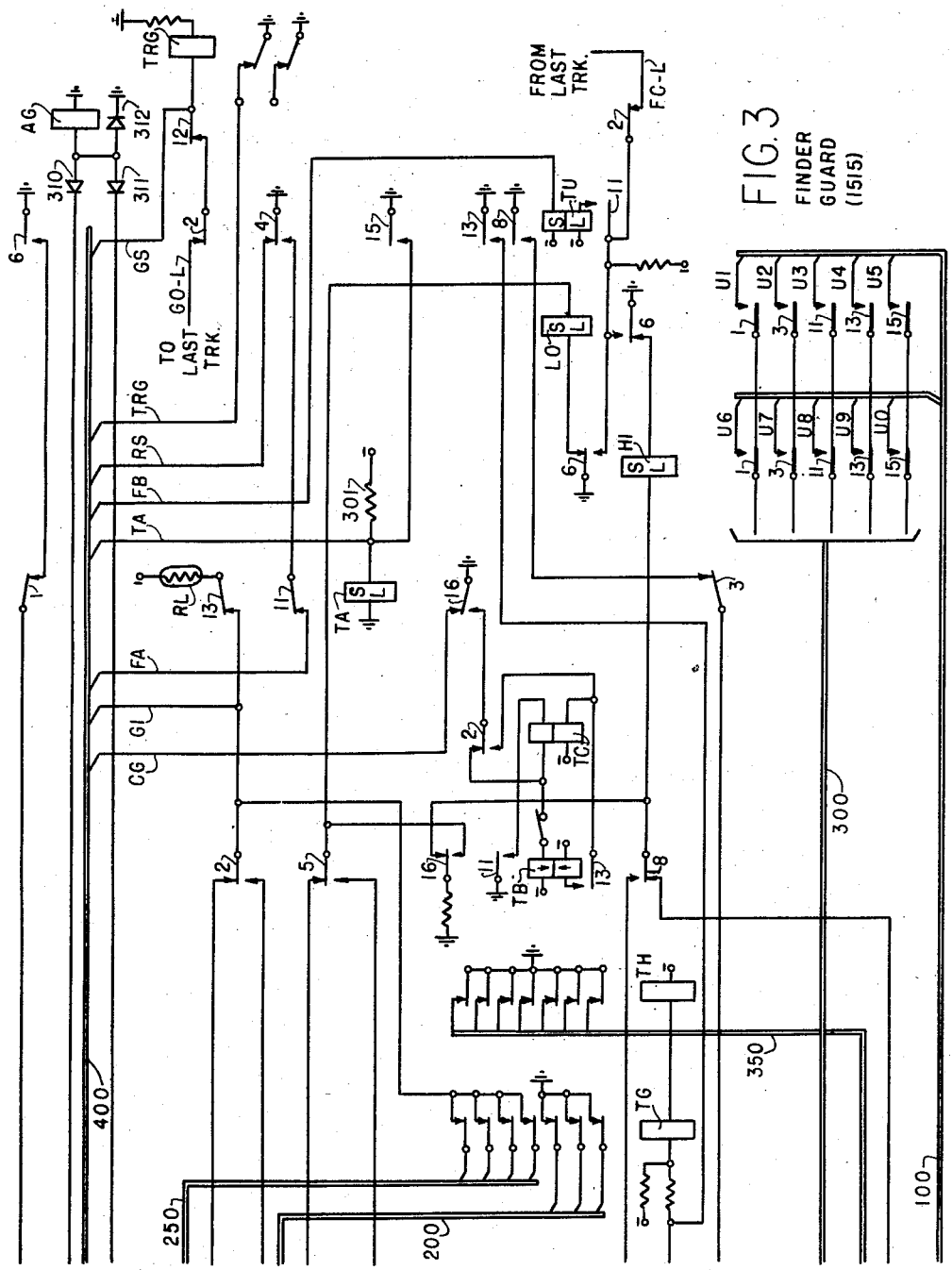
Figure 4:
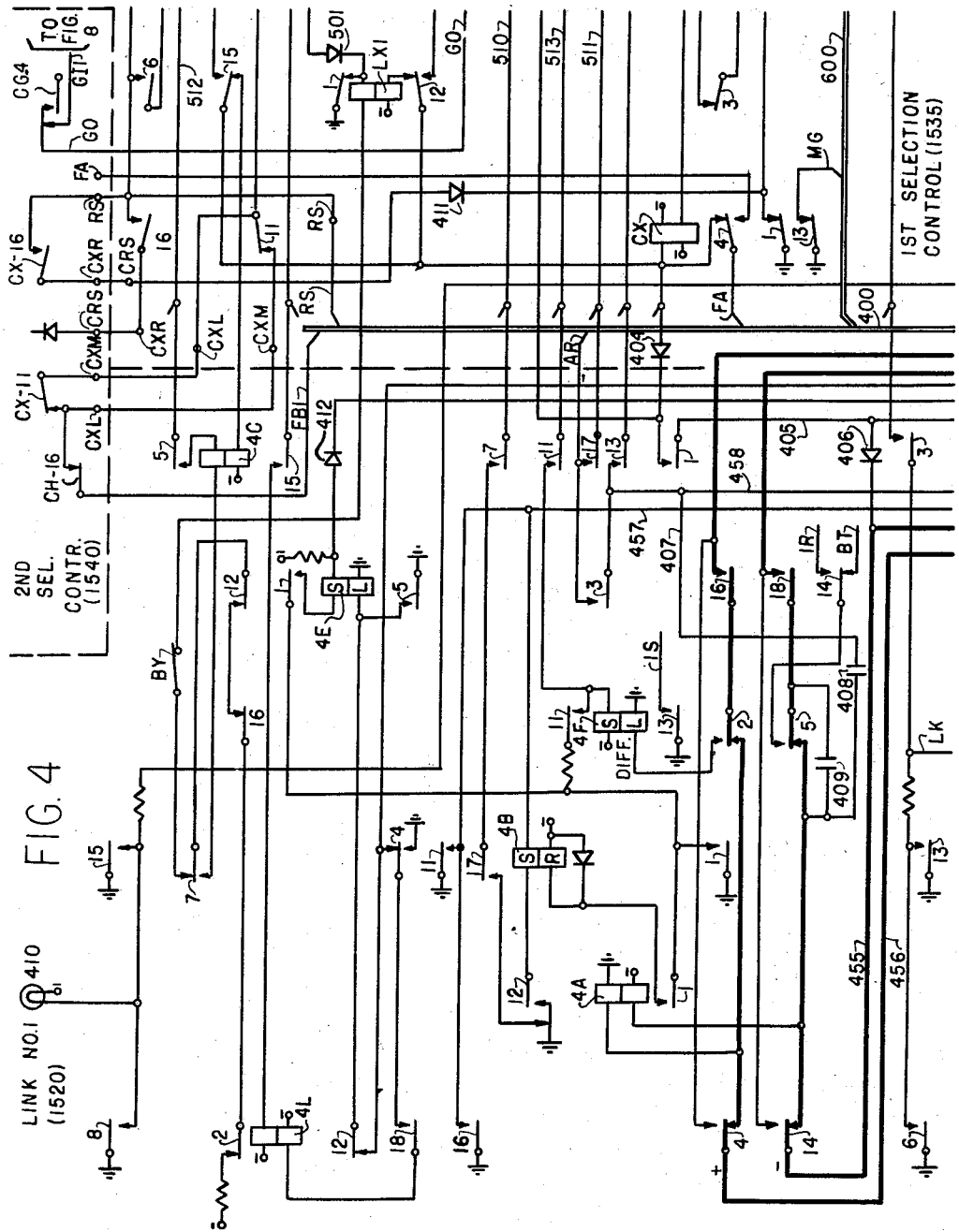
Fig. 4 shows at the left a link circuit, one of which is provided for each pair of finder-connector switches 150, 160, and at the right of the broken line, a portion of a selection control circuit, two of which are provided for controlling the link and connector operation. Each selection control serves three of the six links provided.

Another result of the operation of allotter magnet ARF is the momentary operation of allotter bank guard relay AG in Fig. 3, to assure that the finder allotter bank has been completely cleared, before another finder selection can take place, and so prevent double selections.

It will be noted that the winding of relay AG is connected through a rectifier 310 to the T20 lead to the finder allotter bank, and through a second rectifier 311 to allotter bank lead T50. Whenever any allotter magnet ARF is operated, relay AG is energized in series with the finder tens magnet 50F (not shown) and/or tens magnet 20F. Due to the high resistance of AG, these magnets will not operate in series with it, but relay AG will operate. Should selection ground be found on either of these leads, the corresponding rectifier 310 or 311 will prevent this ground from shunting AG.

Relay AG upon operating, at contacts AG–2 opens the FC–FB chain to the upper winding of relay TU to prevent premature re-operation thereof following its approaching release. Relay AG also, at contacts AG–12 opens the GI–GO chain to further disconnect RL battery from relay TRG and from lead GS to the various selection controls and trunks, for a similar reason.

Finder magnets 20F and 1F upon operating, connect line circuit 121 to the seized link. The link pulsing relay 4A is now held over the calling line loop, from ground and battery through its upper and lower windings, relay contacts L–4 and L–14, finder switch contacts 152, 154, 151, 153, and line wires 23 and 24. Link relay 4B also operates at this time, from ground through 4A–12, upper winding of 4B, finder contacts 156, 155, and the winding of cutoff relay CO1 in the line circuit to battery. The latter relay however, does not receive enough current to operate in this circuit.

Relay 4B upon operating, at 4B–15 lights the link busy lamp 410, at 4B–13 closes a locking circuit for the operated tens and units relays in the finder, at 4B–1 energizes its own lower winding, at 4B–17 prepares the pulsing circuit, and at 4B–11 shunts its own upper winding and connects direct ground to test lead 457 and cutoff relay CO1. Relay CO1 thereupon operates, and disconnects and releases the line relay LR1. Relay 4B also, at break contacts 4B–7 opens the locking circuit to the upper winding of relay LX1, which remains operated over its lower winding. At the same time, make contacts 4B–7 close a circuit for relay CA, in series with the upper winding of 4C, as follows: resistance battery through 4L–2, 4F–16, 4E–12, 4B–7, upper winding of 4C, 4C–5, and the winding of CA to ground.

Relay 4C holds, and relay CA operates, in this circuit. Relay CA thereupon, at CA–16 opens the locking circuit to the lower winding of relay CX, leaving relays CX and LX1 held only by the finder guard circuit ground on lead FA. Relay CA further, at CA–3 closes a circuit to relay CB as follows: ground, CA–3, 61–17, 63–17, 65–5, and the upper winding of CB to battery.

Relay CB operates, and busy lamp 506 lights, in this circuit. Relay CB thereupon, at CB–11 closes another point in the pulsing circuit, at CB–6 disables relay CG and CH, and at CB–14 disables relay RD, and connects dial tone from lead DT to the calling line, via 62–14, 63–2, 65–14, CT–7, 4C–13, lead 407, condenser 408, and contacts L–14 to the calling line. Relay CB finally, at CB–2 and CB–4 disconnects battery from the normally operated relay GD and causes the 750 microfarad (M.F.) timing condenser 504 to start discharging slowly through relay GD and the 4700 ohm resistance, so that, if dialing does not start promptly, relay GD will release after 15 seconds and free the selection control for another call.

Meanwhile, the finder guard circuit is released, as the result of the restoration of the calling party's line relay LR1, in the following manner. Upon the opening of contacts LR–1, the series circuit through guard relays LO, U16 and T2 by way of U16–2 and T2–2 is opened. Relays U16 and T2 thereupon release quickly, and open the operate circuits to the operated finder tens and units magnets, now locked to the link. Relay LO also releases after a brief delay, and at make contacts LO–6 removes ground from the lower winding of relay TU.

Relay TU, which is made sluggish, now releases after a brief delay, and at contacts TU–15 removes the shunt from relay TA in time to prevent the release of the latter. Relay TU also, at TU–13 releases guard relays TG and TH, and at TU–6 and TU–8 further disables the operate circuits of the finder tens and units magnets. Contacts TU–4 at the same time remove ground from the FA lead to Fig. 4, thereby unlocking and releasing selection control relays CX and LX1. Removal of ground from lead FA also releases the operated finder allotter magnet, and opens the circuit to relay AG. Relay AG is made slow to release by the rectifier 312, and releases after a slight delay to re-close the FC–FB and GO–GI chains, and re-operate TRG.

The finder guard circuit is now again normal and ready for another call, with only relays TA and TRG operated, while in the link relays 4A, 4B and 4C are operated, and in the selection control, in addition to the normally operated relays LX2, LX3, and GD, only relays CA and CB are operated.

The release of selection control relay CX extends the FA start lead to the second selection control at CX–4, and at CX–11 and CX–16 further prepares the operation of the second selection control. The release of LX1, at LX1–6 prepares the LX relay reset circuit, at LX1–15 prepares the operation of relay 4C in the second link circuit on the next call through the first selection control, and at LX1–12 prepares the control of LX2 on the said next call through the first selection control. The call immediately following the one now in progress will be handled by the second selection control and link 4, assuming as before, all links to be idle. A third call would be handled by the first selection control and link 2, and so on, with the selection controls acting alternately.

The calling party, upon hearing the dial tone, proceeds to dial the first digit of the number "22." Pulsing relay 4A, in response to the resulting line interruptions releases and re-operates twice. Upon the first release of relay 4A, counting relay 61 operates in the following circuit: ground, 4A–12, 4B–17, 4C–7, CB–11, 62–5, and the lower winding of relay 61 to battery. Relay 61 thereupon, at 61–14 prepares the circuit of relay 62, at 61–11 prepares its own release, and at 61–17 opens the circuit to the upper winding of relay CB. Relay CB, which is made slow to release by the rectifier 508 remains operated however, due to the effect of the pulses in its lower winding, which is connected in parallel with the pulsing circuit, through contacts CB–11.

Upon the first re-operation of relay 4A, the pulsing circuit is opened momentarily. Pulsing relay 62, whose lower winding was shunted by pulse ground on its right terminal and ground from CA–13 on its left terminal, now operates quickly from the ground at CA–13 in series with the lower winding of relay 61, thereby maintaining the latter relay also operated.

Upon the second release of relay 4A, the pulsing circuit is again closed, re-energizing the lower winding of relay CB, and also the upper winding of counting relays 61 and 62, by way of make contacts 62–5. Relays 61 and 62 now have both their upper and lower windings energized. Relay 61, being connected differentially, thereupon releases and disconnects both of its windings, but relay 62 is still energized over its upper winding, and remains operated. Relay 63 also operates at this time, from the pulse ground through contacts 62–5 and 64–14. Relay 63 thereupon, at 63–8 prepares a locking circuit for itself, at 63–17 keeps the upper winding of relay CB disabled, and at 63–2 opens another point in the dial tone circuit. Relay 61 upon releasing, completes the locking circuit to the lower winding of 63, from ground through CA–13, GS–16, 61–14 and 63–8.

Upon the second re-operation of pulsing relay 4A, pulsing ground is removed from the upper winding of relay 62, and this relay releases, leaving only relay 63 operated, in the counting relay group. The removal of pulsing ground from the pulsing circuit at the same time de-energizes the lower winding of relay CB, which also releases, after a short delay.

Relay CB upon releasing, at CB–11 disconnects the pulsing circuit, at CB–6 connects ground to one side of relays CG and CH, at CB–14 disconnects the dial tone lead, and at CB–4 and CB–2 recloses the direct circuit to relay GD and the low resistance charging circuit to the timing condenser 504, via break contacts CH–4.

Figure 8:
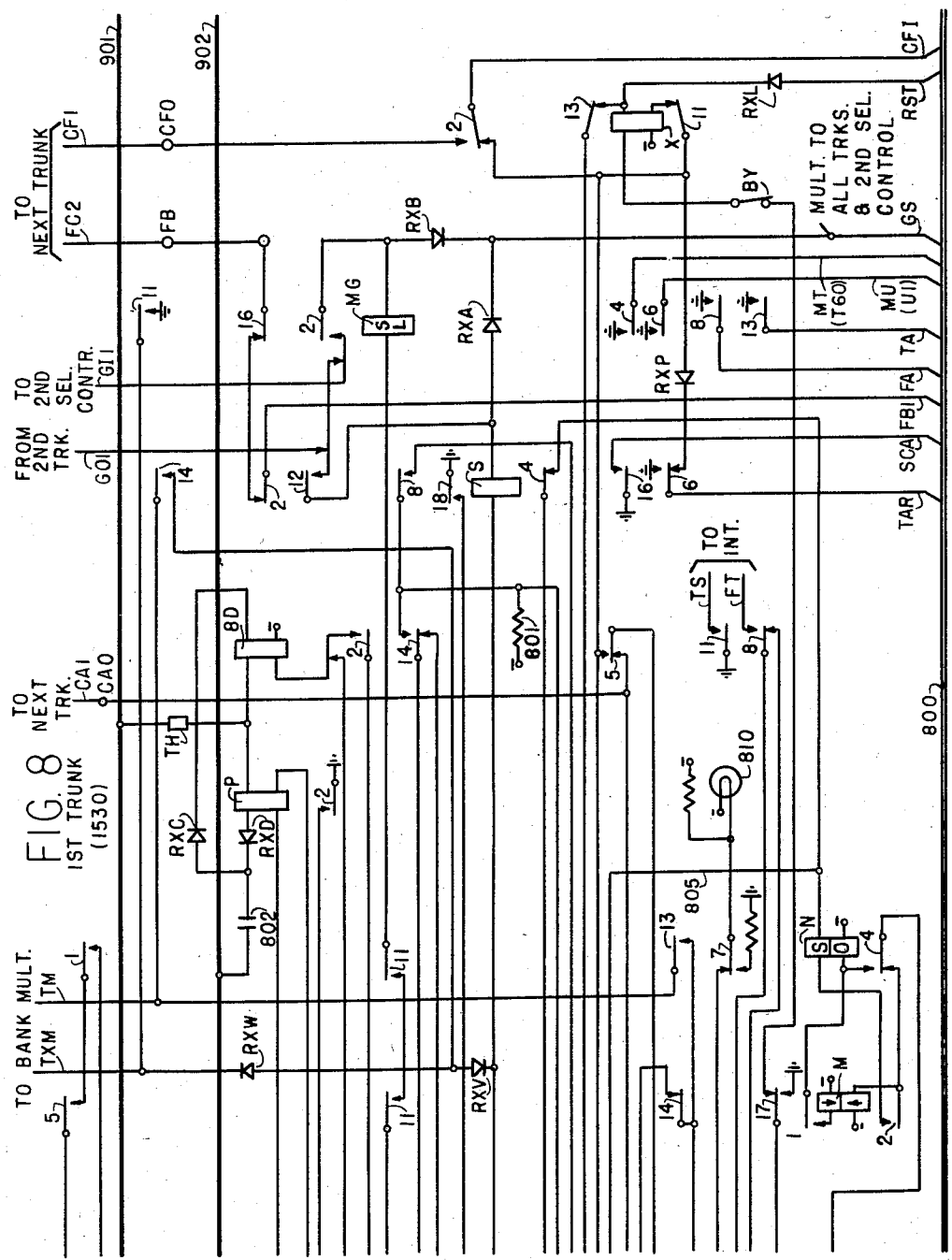

Relays CG and CH now operate in parallel, in the following circuit: ground, contacts CA–3, 61–17, 63–17, CB–6, windings of CG and CH, rectifier 505, lead GS to Fig. 3 via the cables 500, 600 and 400, contacts AG–12 and TU–2, lead GO–L to the last trunk, the GI–GO chain through the various trunks lead GO1 to Fig. 8 of the first trunk, contacts S–12 and MG–2, lead GI1 to the second selection control (Fig. 4), contacts CG–4 in the second selection control, lead GO to Fig. 5, contacts CG–4 in the first selection control, lead GI to Fig. 3 through the cables 500, 600 and 400, and contacts TA–13 to RL battery. If another selection operation has the GI–GO chain already open at the instant CB releases, the operation of relays CG and CH may be delayed slightly.

Assuming however that relays CG and CH have operated, relay CG at CG–4 removes RL battery from the GO–GI chain and hence from lead GO–L to relay TRG in Fig. 3. This, together with the low resistance ground through rectifier 505 on the lead GS to relay TRG, causes the latter relay to release. This removes TRG ground from the various trunk control circuits momentarily, to prevent the resetting of any idle trunks at this time. Relay CG at the same time, at contacts CG–1 operates the allotter magnet of the connector switch 160 in the following circuit: ground, 63–11, 65–12, CT–2, CG–1, 4C–17, lead AR, cable 400, winding of magnet ARC, and battery.

Relay CH at the same time at contacts CH–11 and CH–13 connects ground through 250 ohms to both sides of relay GS, which of course remains at normal. The 250 ohm circuit from CH–11 is direct, but that from CH–13 is from 4B–15 through the allotter magnet contacts ARC–1, lead SCA in the cables 400 and 600 to Fig. 5, and through contacts CH–13, CA–11 and GS–2. Relay CH further, at CH–16 disconnects the operate circuit to finder guard relay TU momentarily, to prevent interference by a new call, and at CH–1 operates the connector tens magnet 20C as follows: ground, CH–1, GS–8, 63–14, 65–8, 64–5, CUA–8, lead T20 in the cables 600 and 400, the corresponding allotter bank contact, and the winding of magnet 20C to battery. Relay CH finally, at CH–4 disconnects battery from timing relay GD and closes a parallel discharge path for condenser 504. Relay GD will hold for 1 second in this circuit, and if the tens selection has not been completed in that time, relay GD will release and free the selection control circuit.

Connector magnet 20C upon operating, closes the crossbar contacts associated with the 20th line group including the contacts 162, 164, 166, 168. Magnet 20C at the same time at contacts 20C–1 extends its own direct operate ground from CH–1 to relay GS by way of ARC–1, lead SCA, cables 400 and 600, CH–13, CA–11, and GS–2.

Relay GS operates in this circuit, and locks, by way of contacts GS–2 and CB–17 to ground at CA–5. Relay GS also, at GS–8 opens the operate circuit to connector magnet 20C which remains locked however to resistance ground at contacts 4B–15. Relay GS further, at GS–16 unlocks and releases counting relay 63, and at GS–13 operates relay CT from ground through contacts CA–5, CUB–14, GS–13 and DA–12. Relay CT thereupon, at CT–11 prepares the operation of CUA and CUB now shunted by ground from CA–5 on both sides of their windings, at CT–7 opens another point in the dial tone circuit, at CT–16 opens another point in the circuit to CX and at CT–6 prepares a balancing 500 ohm battery connection for relay GS.

Counting relay 63 upon restoring, at 63–11 opens the circuit of the connector allotter magnet ARC, which also restores. Relay 63 at the same time, at 63–17 releases the CG and CH relays, and re-operates CB over its upper winding, from the original ground at CA–3. The CG and CH relays thereupon re-establish the FB chain to finder guard relay TU, and the GI–GO chain to TRG, which re-operates.

Transfer relay CB upon operating, at CB–2 and CB–4 starts the 15-second discharge cycle through timing relay GD, so that if the second digit does not follow the first within that time, relay GD will restore and release the connection. Relay CB also, at CB–6 opens another point in the circuit to CG and CH, at CB–11 again prepares the pulsing circuit, and at CB–17 unlocks and releases relay GS.

Relay GS upon releasing, at GS–8 again prepares the connector magnet operate circuits, and at GS–13 opens the operate circuit of relay CT. This removes one of the shunting grounds from the units selection relays CUA and CUB, and these relays operate in series with CT, and lock the latter operated, from ground at CA–5 through the winding of CUA and CUB in parallel, CT–11, and the winding of CT to battery. The circuit is now ready for the dialing of the units digit, with relays 4A, 4B and 4C operated in the link, and GD, CA, CB, CT, CUA and CUB operated in the selection control.

Responsive to the dialing of the second digt "2," relay 4A again releases and re-operates twice and passes two pulses to the counting relays, via contacts 4A–12, 4B–17, 4C–7 and CB–11. Counting relays 61 and 62 operate in succession on the first pulse, as before, with relay 63 operating and 61 and 62 releasing in succession as before on the second pulse. Transfer relay CB then releases after a brief delay as before, and at contacts CB–2 and CB–4 again closes the timing condenser charging circuit and resaturates relay GD. Relay CB at the same time at CB–6 again connects ground from CA–3 to relays CG and CH, and these relays again operate in parallel over lead GS to Fig. 3, contacts AG–12 and TU–2, and out over the GO–GI chain and back to RL battery.

Relay CG upon operating, opens the GO–GI chain and releases TRG momentarily as before and at CG–1 re-operates the connector alloter magnet ARC. Now however, the circuit is from ground through break contacts GS–5, make contacts CT–2, CG–1, 4C–17, and lead AR. Relay CH upon operating, at CH–11 and CH–13 grounds both sides of GS as before, and at CH–1 operates the connector units magnet 2C in the circuit: ground, CH–1, GS–8, 63–14, 65–8, 64–5, CUA–8, lead U2 through cables 600 and 400 and the appropriate allotter bank contacts to the winding of magnet 2C and battery. Relay CH in addition, at CH–4 again closes the one second discharge circuit for timing relay GD.

The connector units magnet 2C upon operating, closes the connector switch crossbar contacts 161, 163, 165 and 167 leading to the line circuit 122 of the called line 22. Magnet 2C at the same time, at its contacts 2C–1 prepares a locking circuit, and extends its own operate ground to GS, by way of ARC–1, lead SCA, cables 400 and 600, CH–13, CA–11, and GS–2. Since this is again a direct ground, relay GS again operates, and locks as before to direct ground at CA–5. Relay GS also at contacts GS–16 unlocks and releases counting relay 63, and at GS–8 opens the operate circuit to units magnet 2C, which however, holds to resistance ground at 4B–15. Finally, relay GS at break contacts GS–5 releases allotter magnet ARC, and at make contacts GS–5 operates link relay 4F in the circuit: ground, make contacts GS–5, CUB–11, 4C–11, upper winding of 4F, battery.

Counting relay 63 upon releasing, opens contacts 63–11 without effect, and at 63–17 opens the circuit to relays CG and CH. Magnet ARC and relays CG and CH restore, and the latter reset the GO–GI and FB–FC chain circuits, and the GD relay timing circuit, as before. Relay 63 also at 63–17 re-closes the circuit from CA–3 to the upper winding of relay CB which again operates. Relay GS is thereby unlocked at contacts CB–17, and this relay also releases. Relay CB also places relay GD in the 15-second discharge cycle, so as to cause the forced release of the selection control, if the latter is not released promptly.

Meanwhile, in the link, relay 4F has operated after a brief delay, due to being made sluggish, and at 4F–11 has locked through a resistor to ground at 4B–1. If the called line is idle, the sluggish test relay 4E will also have operated, after a similar delay, in series with line cutoff relay CO2 in the circuit: ground, lower winding of 4E, contacts 4L–12, crossbar contacts 166, 165 in the connector, winding of CO2, and battery. Relay 4E thereupon locks over its upper winding to ground at 4B–1, and at contacts 4E–5 connects direct ground to CO2 to cause the latter relay to operate and clear the line for ringing. Relay 4E also, at 4E–14, 4E–16 and 4E–18 closes points in the ringing circuit, and at 4E–12 opens the series circuit through relays 4C and CA to free the selection control. Relay 4F also at 4F–16 opens another point in the circuit through 4C and CA, at 4F–13 grounds the ringing interrupter start lead IS, and at 4F–2 and 4F–5 completes the ringing circuit.

Interrupted ringing current is now impressed on the called line from the IR lead over contacts 4E–14, 4F–5, 4E–18, connector crossbar contacts 164, 163, line wire 26, the telephone bell at the called station 22, line wire 25, connector contacts 161, 162, contacts 4E–16 and 4F–2, to ground through the lower winding of 4F. Some of this ringing current leaks back to the calling line as ring-back tone, through condenser 409.

When the called station answers, by removal of the receiver or handset, superimposed negative battery on the IR lead causes a direct current energization of the lower winding of relay 4F, which is unaffected by the ringing current. Since relay 4F is connected differentially, this direct current flow in its lower winding overcomes the locking current in its upper winding. Relay 4F accordingly releases and disconnects the ringing current. Relay 4F at the same time at break contacts 4F–2 and 4F–5 completes the talking connection between the calling and called stations, with talking battery being supplied to both telephones through the windings of pulsing relay 4A.

Relay 4A will not release therefore, at the end of the call, until both parties hang up. When 4A releases, it opens the circuit to 4B, which also restores, after a brief delay. Relay 4B upon restoring, at 4B–13 and 4B–15 unlocks and releases the finder and connector tens and units magnets, and at 4B–1 opens the locking circuit to 4E, which also releases, after a short delay.

Should the called line be found busy when the connector switch operates, the connector crossbar contacts will find ground on the test lead of the called line. This ground, passing through connector contacts 165 and 166, will shunt the lower winding of test relay 4E, and prevent the operation of this relay. The ringing circuit cannot therefore be completed, and the called line is not rung. The operation of ringing relay 4F however, will connect a busy signal to the calling line as follows: busy tone on lead BT, 4E–14, 4F–5, condenser 409, 4L–14, finder contacts 154, 153, line wire 24, the calling telephone at station 21, line wire 23, finder contacts 151, 152, 4L–4, and the upper winding of relay 4A to ground.

The release of the selection control takes place as follows. Upon the opening of the series circuit through relays 4C and CA, whether it be caused by the operation of 4E or 4F, the relays 4C and CA release, and relay 4C disconnects the selection control from the link. Relay CA, in turn, at CA–5 opens the locking circuit of relays CUA, CUB and CT, and at CA–3 opens the circuit to the upper winding of CB. Relays CUA, CUB, CT and CB accordingly release.

Call sequence

The selection control is now ready for the next call, except for the re-operation of relay CX. If the second selection control is still idle, relay CX will remain at normal, and the next call will be handled by the second selection control. If the latter has been used in the interval, however, by another call, or as soon as it is so used, its relay CX will be in the released position, or will release. With relays CA and CT again normal in the first selection control, a circuit is now closed for the re-operation of relay CX therein, as follows: ground, TU–4 (Fig. 3), lead RS in cable 400 to Fig. 4, the now closed break contacts CX–16 in the second selection control, CT–16, RD–15, CA–16, contacts LX2–3 and LX3–3 in parallel, GD–11, and the lower winding of CX to battery. Relay CX operates in this circuit and completes the preparation of the first selection control for handling a third call, in cooperation with link No. 2, it being assumed that a second call has been handled by the second selection control and link No. 4.

Upon the arrival of the third call, ground from the finder guard on the FA lead holds CX and LX2 over their lower windings and operates link relay 4C in link No. 2, by way of make contacts CX–4, break contacts LX1–15 and make contacts LX2–15. Relay 4A in link No. 2 and the allotter magnet ARF in the associated finder then operate, followed by the finder tens and units magnets corresponding to the calling line. Relay 4B in link No. 2 then operates, and connects the upper winding of 4C therein, in series with relay CA in Fig. 5, over the multiple connection to lead 512 indicated conventionally in Fig. 4 at the upper right. Link No. 2 and selection control No. 1 now interact over the various multiple and individual connections and complete the call, in the manner already described for link No. 1, with relays CX and LX–2 releasing as soon as the finder guard is released and removes the FA ground at TU–4. Relay CX thereupon prepares the seizure of the second selection control for the fourth call, and relay LX2 prepares the seizure of link No. 3 on the fifth call.

The fourth call will now be handled by the second selection control and link No. 5, and on the release of the finder guard, ground from TU–4 on lead RS will re-operate relay CX in the first selection control, via rectifier 411, in the manner explained in the second last paragraph. A branch of this circuit will also be extended to the upper winding of LX3 over contacts LX1–6 and LX2–6 in parallel, but this is without effect, since relay LX–3 is already in the operated position.

Upon the arrival of the fifth call, finder-guard ground on the FA lead operates relay 4C in link No. 3, over CX-4, LX1-15, LX2-15, and LX3-15, with CX and LX3 holding in this circuit, temporarily. Link No. 3 and selection control No. 1 interact in the usual way to complete the call. Upon the release of the finder guard, when relay TU removes ground from lead FA and connects it to lead RS, relays CX and LX3 release. The ground on lead RS is now extended as before to the upper winding of LX3, but this is again without effect as the battery circuit for relay LX3 is now open in link No. 3 at contacts 4B-7 therein. This RS ground is now however, also extended through contacts LX3-6 and rectifiers 502 and 501 to the upper windings of LX1 and LX2. If the associated links are now idle, these relays will re-operate by way of contacts such as 4B-7, 4E-12, 4F-16 and 4L-2 to battery.

The sixth call is handled similarly by the second selection control and link No. 6, with links 4 and 5 being reset in the same manner as links 1 and 2. The seventh call will revert to the first selection control and will reset LX3, while the eighth call will reset link No. 6. If any of these links are still busy when their turn comes to be reset, their resetting will simply be deferred until a subsequent operation of the associated selection control finds them idle.

*Forced release on delayed dialing*

If the calling party fails to dial after initiating a call, upon the release of the finder guard circuit following the operation of the finder, relays 4A, 4B and 4C will be found operated in the link which handled the call, together with relays CA, CB and GD in the associated selection control. As previously explained, upon the operation of CB, its contacts CB-2 disconnect battery from timing relay GD and timing condenser 504, while contacts CB-4 set up the 15 second discharge circuit for condenser 504 through the 4700 ohm resistor and relay GD.

After 15 seconds the charge on condenser 504 is reduced to the point where relay GD releases. Relay GD thereupon opens its make contacts GD-11 and closes its break contacts GD-2. Contacts GD-11 open the reset circuit to realy CX to prevent a premature re-operation of this relay, while contacts GD-2 connect ground to the upper winding of relay 4F, via contacts 4C-11. Relay 4F operates in this circuit, and locks to 4B-1. Relay 4F also starts the interrupter, at 4F-5 connects busy tone to the calling line through condenser 409, and at 4F-16 opens the series locking circuit through relays 4C and CA. Relay 4C releases, and disconnects the selection control from the link. Relay CA also releases, and at CA-3 releases CB. Relay CB releasing, re-operates GD and re-charges the timing condenser 504. Relay GD operating, at GD-11 prepares the reset circuit to relay CX. The calling party now hangs up in response to the busy tone, and relays 4A, 4B and 4F in the link release, to restore the link to its normal condition. The finder magnets also release, as does the cutoff relay in the line circuit.

If the calling party dials the first digit promptly, but fails to dial the second digit within 15 seconds of the first, a similar action takes place. Substantially the only difference is that relays CT, CUA, and CUB in the selection control will also be found operated. These relays will accordingly be released when relay CA releases, and opens its contacts CA-5, to which these three relays are locked, following the completion of the first digit.

*Forced release on an incomplete selection*

If following the proper dialing of a first or second digit, the connector fails to function properly, timing relay GD again acts to free the selection control. In such a case relays 4A, 4B and 4C in the link will be operated as before, and in the selection control relays GD, CA, and CB plus one or more of the counting relays 63—65 will be operated. If the failure should occur at the second digit, relays CT, CUA and CUB will also be operated.

Following the last impulse of the digit involved, relay CB releases as previously explained, and operates CG and CH over the GS lead to Fig. 3, and the GO-GI chain to RL battery. The release of CB causes contacts CB-4 to shunt the 4700 ohm resistance in series with timing condenser 504, and the operation of CH causes contacts CH-4 to shunt relay GD through 500 ohms, thereby placing relay GD in its 1 second release cycle.

If at this time, the connector allotter magnet or the connector tens or units magnet fails to operate, following the operation of CG and CH, the allotter magnet ARC will not return ground over the SCA lead for the operation of relay GS. Since break contacts GS-16 remain closed, the locking circuit to the counting relays is not opened, and the counting relays do not release. The circuit to CG and CH through CA-3 and CB-6 and make contacts 61-17, 63-17 or 65-5 is accordingly maintained intact. These relays therefore remain operated, and block all other calls, due to the open GO-GI chain at contacts CG-4.

One second later however, timing relay GD releases, and at contacts GD-2 operates link relay 4F as before, by way of contacts 4C-11. Relay 4F thereupon gives the busy signal, and releases 4C and CA. Relay 4C frees the selection control, while relay CA, at CA-5 releases CT, CUA and CUB if operated, at CA-3 releases CG and CH, and at CA-13 releases the counting relays. Relay GD re-operates, on the release of CH, and in the link, relays 4A, 4B and 4F release when the calling party hangs up in response to the busy signal.

*Digit absorption*

The absorption of a first digit "1," which is not assigned, but which may be transmitted by accident or dialed by inadvertence, takes place in the following manner, assuming that a link and selection control have been seized, and that relays 4A, 4B and 4C are operated in the link, and GD, CA and CB in the selection control.

When pulsing relay 4A restores and re-operates, to pass the single pulse to relay CB and the counting relays counting relay 61 operates on the first part of the pulse and relay 62 on the last part of the pulse, as previously described, and lock over their lower windings in series to ground through 61-14, GS-16 and CA-13. Break contacts 61-17 accordingly open the circuit to the upper winding of CB, and this relay releases, after the usual slight delay, following the cessation of the effect of the pulse in its lower winding.

Make contacts 61-17 and break contacts CB-6 now extend ground from CA-3 to relays CG and CH which operate. Relay CG at CG-1 prepares the operate circuit through 4C-17 to the connector allotter magnet ARC, but due to the fact that counting relays 63 and 64 are now normal, this circuit is open at make contacts 63-11 and 64-11, and magnet ARC cannot operate. Relay CH however, at CH-1 closes a circuit for digit absorption relay DA as follows: ground, CH-1, GS-8, 63-14, 65-16, 62-11, 64-8, CUA-2, and the winding of DA to battery.

Digit absorption relay DA operates in this circuit, and at contacts DA-12 opens the circuit to TC to prevent the operation of this relay, and the subsequent operation of relays CUA and CUB. Relay DA also, at DA-1 extends its own operate ground to relay GS, which operates, and at make contacts GS-2 locks to CA-5. Relay GS also, at GS-8 opens the circuit to slow-releasing relay DA, and at GS-16 unlocks and releases the counting relays. Make contacts 61-17 thereupon release relays CG and CH, while break contacts 61-17 reoperate CB. Relay CB thereupon at CB-17 unlocks and releases GS, and at CB-14 re-connects dial tone to the calling line. Absorption relay DA having also released by this time, the selection control is now ready to receive an assigned digit.

Finder guard preference circuit

The order in which calls are accepted by the finder guard circuit is controlled by the finder guard relays TA, TB and TC. As previously indicated, relay TA is normally held operated, by battery through the resistance 301, and is momentarily shunted by ground from TU–15 each time relay TU is operated in response to the landing of a call. Relay TA holds, however, if the call is cleared promptly.

With preference relay TB normal, as shown, the chain circuits controlled by the guard tens and units marking relays give preference to the lowest numbered line, where several calls land simultaneously, since the lower numbered relays open the locking circuits to the higher numbered relays, in each group. Relay TB also gives preference to the 1 to 5 units selections over the 6 to 0 units selections, by maintaining a 2000 ohm shunt on relay HI, which as previously indicated, is associated with the units digits 6 to 0. This makes relay HI slower to operate than relay LO, which gives preference to the units digits 1 to 5. Thus, if lines 21 and 26 initiate calls simultaneously, relay U16 upon operating, will close a first locking circuit through U16–2 to relay LO and a second locking circuit through U16–14 to relay HI. Relay LO will operate first however, and will disconnect HI, and prevent its operation. The call from line 26 will therefore be delayed for perhaps a fraction of a second, while the call from line 21 is being switched through to a link.

If the extension of the call to the link is not completed and the finder guard released, within the release time of relay TA, the latter relay will restore. Relay TA thereupon at TA–1 and TA–3 removes ground from the finder tens and units marking leads, at TA–11 opens the FA lead to release the link, and at TA–13 releases the finder guard tens and units marking relays, thereby releasing the finder guard. Relay TA further, at make contacts TA–16 opens the trunk lead CG, which has no significance in the present instance, and at break contacts TA–16 operates relay TB over its upper winding. Relay TA re-operates, after a slight delay, following the release of TU, to prepare the re-operation of the finder guard. When break contacts TA–16 open, a shunt is removed from the upper winding of relay TC and the latter operates in series with TB and locks the latter operated, from ground at TB–11 through the upper windings of both relays.

As a result of the operation of relay TB, it will be seen that the contacts TB–2, TB–5 and TB–8 have reversed the direction of the locking chains for the tens and units marking relays. This reverses the order of preference, so that the last tens digit (5), and the last units digits (5 and 0) in the two units sub-groups, now have first choice. At the same time, contacts TB–16 remove the 2000 ohm shunt from relay HI and connect it to relay LO. This makes LO slower to operate than HI, thus giving the 6–0 units group preference over the 1–5 group.

Relay TB will remain in the operated position until the next release of TA. When this occurs, break contacts TA–16 energize the lower windings of both relays TB and TC. Relay TC holds in this circuit, but differential relay TB, with both its windings energized in opposition, is caused to release. And when TA re-operates, relay TC also releases. If no other calls are waiting, at the time such a reversal of precedence takes place, the call will continue to seize the finder guard, which will repeat the reversals at each such seizure, until the call succeeds, or is abandoned. But if other calls are initiated during this time, on one reversal or on the succeeding one they will "steal" the finder guard away from the first call. In this way, a failure of this type will not prevent service to the other lines. And if a different link is assigned, on successive landings by the first call, it may also switch through, if the trouble was in the link.

Outward trunk calls

Stations whose extra control line relay LR grounds the extra control terminal XC when operated, as in line circuit 121, are prevented from initiating trunk calls. Only non-restricting stations such as station 20 in Fig. 1, can do this.

Upon removal of the handset, not shown, at station 20, line relay LR0 at the switchboard operates over the line loop in the usual way. Contacts LR0–12 thereupon close, without effect, but contacts LR0–1 close a circuit for operating the finder guard tens and units relays T2 and U50 in series. This circuit is from ground at break contacts of relay TH in Fig. 3, through the cable 350, lower winding of U50, contacts LR0–1, winding of T2, cable 250, upper break contacts of relay TG, and make contacts TA–13 to RL battery.

Relays T2 and U50 upon operating, at contacts T2–2 and U50–14 prepare a locking circuit for themselves in series with relay HI, now shunted by ground on both sides of its winding. Contacts T2–11 and U50–11 at the same time close the series circuit to relays TG and TH, while T2–14 and U50–8 prepare circuits to the appropriate tens and units magnets in the finder.

Relays TG and TH now operate, and disconnect the original operating battery and ground from relays T2 and U50. The shunt on relay HI is thereby removed and this relay operates in series with T2 and U50 and locks the latter operated, in the following circuit: ground, LO–6, winding of HI, TB–8, break contacts U16–14 to U49–14, make contacts U50–14, winding of U50, LR0–1, winding of T2, T2–2, TB–2, and TA–13 to RL battery.

Relay HI upon operating, at its lower contacts prepares circuits for the finder units magnets 5F to 0F, not shown, and at break contacts HI–6 disables its companion relay LO. Make contacts HI–6, on the other hand, close a circuit for TU as follows: ground HI–6, AG–2, lead FC–L to the last trunk, over the FC–FB chain through the trunks via contacts such as MG–16 and S–2 (Fig. 8), lead FB1 in Fig. 8, over the cables 800 and 400 to CH–16 in the second selection control, CX–11 and CH–16 in the first selection control, lead, FB over the cables 500 and 400 to Fig. 3, and through the upper winding of relay TU to battery.

Relay TU operates in this circuit and locks to HI–6, prepares the finder tens and units operate circuits, holds TG and TH, shunts TA, disables the RS and GS circuits, releases TRG, and grounds the FA start lead. Assuming the first link to be available as before, relay 4C therein now operates from the ground on lead FA, via contacts CX–4 and LX1–15. Relay 4C accordingly seizes the associated selection control circuit, and at contacts 4C–1 causes the operation of link relay 4A and finder magnet ARF, from the same ground on lead FA, as before.

Allotter magnet ARF upon operating, causes the operation of guard relay AG in Fig. 3, in the manner previously explained, and completes the operate circuits to the selected tens magnet 20F, and to the units magnet 0F not shown. The circuit for 20F is as before, from ground at TU–6, through TA–1, T2–14 and lead T20, while that for 0F is from ground at TU–8, through TA–3, break contacts U16–8 to U49–8, make contacts U50–8 and HI–15, and lead Uo to the finder units magnet.

The calling line and its associated line circuit 120 are now connected to the link, through the crossbar contacts controlled by units magnet 0F corresponding to 151, 153, 155 and 157, in series with the contacts 152, 154, 156 and 158 controlled by tens magnet 20F. Link relay 4B accordingly operates in series with line cutoff relay CO*o* via contacts 156 and contacts corresponding to 155. Relay 4B then, at 4B–7 disconnects battery at 4L–2 from the upper winding of relay LX1, and connects it to the upper winding of 4C, thereby causing the operation of relay CA in the selection control in series with 4C, and locking the latter operated. Relay 4B at the same time at 4B–11 connects direct ground to the line cutoff relay CO*o*. The latter thereupon operates, and disconnects and releases LR*o*.

Upon the release of LR0, contacts LR0–1 open the series circuit through T2, U50 and HI. The first two release quickly, but sluggish relay HI releases only after a slight delay. Relay HI then opens the locking circuit of TU which also releases after a short delay, and opens the FA start lead. Allotter magnet ARF, and selection control relays CX and LX1 all release, upon the opening of the FA lead, and the release of ARF permits the release of relay AG and the re-operation of TRG, in the finder guard circuit. Guard relays TG and TH also restore upon the release of TU, to complete the restoration of the finder guard circuit to normal.

In the selection control circuit, the operation of relay CA in series with link relay 4C causes the operation of CB from ground through make contacts CA–3 and break contacts 61–17, 63–17 and 65–5. Relay CB in turn, at CB–2 and CB–4 starts the 15-second timing cycle, at CB–14 connects dial tone to the calling line via 62–14, 63–2, 65–14, CT–7, 4C–13 and condenser 408, and at CB–11 extends the pulsing circuit to the counting relays and its own lower winding.

The calling party, upon hearing the dial tone, proceeds to dial the single digit assigned to trunk calls which is most commonly "9" or "0," but which is here assumed to be "9." Link relay 4A follows the pulses, and passes nine impulses of current to the counting relays over the leads 510 and 507 and contacts 4A–12, 4B–17, 4C–7 and CB–11.

On the first pulse, counting relay 61 operates, as before, and relay 62 operates on its cessation, in series with 61. On the second pulse, relay 63 operates and 61 releases, as before, and on its cessation, relay 62 also releases. On the third pulse, relay 61 again operates, via break contacts 62–5, and on its interruption 62 operates in series with 61 from the ground at CA–13, while relay 64 operates in series with 63 in the circuit: ground CA–13, GS–16, lower winding of 64, 62–2, 63–8, and the lower winding of 63 to battery. Relay 64 on operating, locks in the circuit: CA–13, GS–16, 64–17, 65–2, and the upper winding of 64 to battery. On the 4th pulse, relay 61 is released as before by its opposing currents, but relay 62 holds momentarily as usual from the pulse in its upper winding, while relay 63 holds over its lower winding to ground through 63–8, 61–14, GS–16, and CA–13. On the cessation of the pulse relay 62 restores, but 63 and 64 remain locked.

On the fifth pulse, relay 61 again operates and 62 stays normal momentarily, due to its shunted lower winding. The operation of relay 61 unlocks and releases relay 63 at break contacts 61–14, but relay 64 remains locked, over its upper winding. On the cessation of the pulse, relay 62 operates in series with 61, in the usual way.

On the sixth pulse relay 61 is again released while 62 holds via its upper winding momentarily. Relay 65 now also operates from pulse ground through make contacts 62–5, make contacts 64–14, break contacts 63–4 and the lower winding of 65 to battery. Relay 65 then locks via 65–18 to the ground through GS–16 and CA–13 and at 65–2 transfers the locking circuit for relay 64 to pulse ground through break contacts 63–6. On the cessation of the pulse, 62 and 64 therefore release, and 65 alone remains operated.

On the seventh pulse relays 61 and 62 re-operate one after the other in the usual way, but no other counting relays are affected, and relay 65 remains locked.

On the eighth pulse relay 63 re-operates via make contacts 62–5 and break contacts 64–14, and relay 61 releases. Relay 63 then locks over its lower winding to ground through make contacts 63–8 and break contacts 61–14. On the cessation of the pulse, relay 62 releases, leaving only 63 and 65 operated.

On the ninth pulse, relay 61 re-operates, and on its cessation 62 operates in series with it as before. Since break contacts 61–14 are now open, the operation of 62 again causes 64 to operate in series with 63 in the circuit: ground, CA–13, GS–16, lower winding of 64, 62–2, 63–8, and the lower winding of 63. Relay 64 then locks over its upper winding to the same ground, via make contacts 65–2, 63–6 and 64–17. All five counting relays are now operated. If digit "0" had been dialed, the only effect of the last pulse would be to release relays 61 and 62.

The following table shows the effect of each complete pulse on the counting relays.

| After Pulse | Counting Relays Operated | | |
|---|---|---|---|
| 1 | 61, 62 | | |
| 2 | | 63 | |
| 3 | 61, 62 | 63, 64 | |
| 4 | | 63, 64 | |
| 5 | 61, 62 | 64 | |
| 6 | | | 65 |
| 7 | 61, 62 | | 65 |
| 8 | | 63 | 65 |
| 9 | 61, 62 | 63, 64 | 65 |
| 0 | | 63, 64 | 65 |

Since the dial tone circuit via CT–7 passes through break contacts on counting relays 62, 63, and 65, and since one or the other of these relays is in the operated position at each pulse, it will be apparent that the dial tone circuit is opened at the end of the first pulse and is kept open during the remaining pulses. For a like reason, the circuit to the upper winding of relay CB is taken through break contacts on counting relays 61, 63, and 65, so that the upper winding of CB is de-energized at the start of the first pulse, and kept de-energized during the remaining pulses. During the pulsing, relay CB is held operated therefore, only by the effect of the recurrent pulses in its lower winding, as previously explained.

Relay CB now releases, after a slight delay, following the ninth and last pulse, and at CB–2 and CB–4 stops the 15 second timing cycle, and recharges condenser 504. Relay CB at the same time at CB–6 operates relays CG and CH in the circuit: ground, CA–3, 61–17, CB–6, relays CG and CH, lead GS, AG–12 and TU–2 (Fig. 3), and the GO–GI chain through the selection controls and trunks, and back to RL battery in Fig. 3. Guard relay TRG is shunted in this circuit, and releases momentarily, as previously explained.

Figure 7:
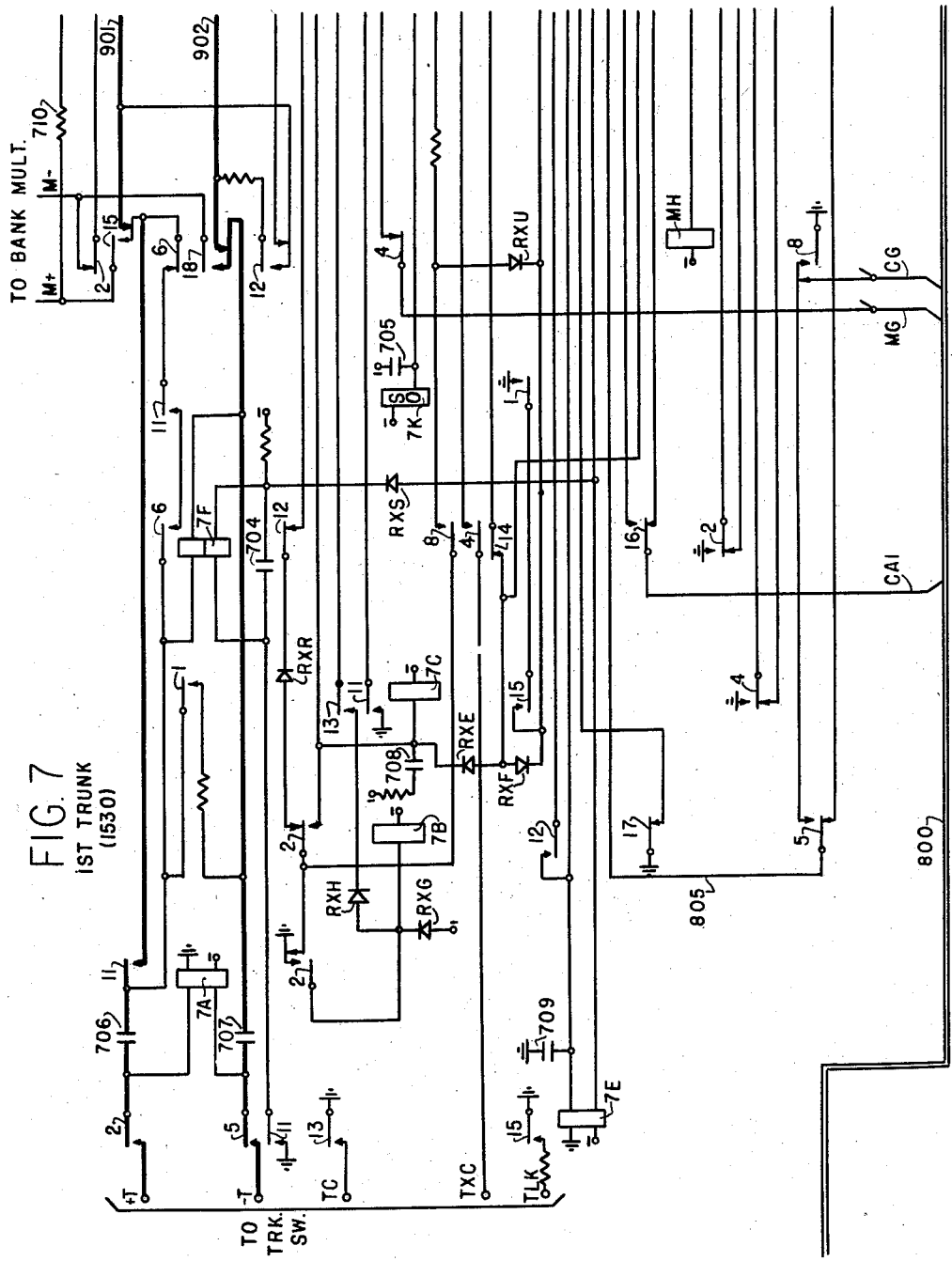
Figs. 7, 8 and 9 show one of the trunk circuits connecting the P.A.B.X to the main exchange.

At this point, it should be noted that relay X in each idle trunk is normally locked operated over its upper winding in the following circuit: ground, 7B–17, X–13, winding of X, M–17, 7C–4, 8D–8, 7F–2, and N–7 to battery through 1,000 ohms and trunk busy lamp 810 in parallel. Lamp 810 will not light in this circuit, due to the high resistance of relay X. At the same time relay X in the first idle trunk, which will be assumed to be trunk No. 1 shown in Fig. 7 and 8, is locked also over its lower winding, in series with relay RSA in the common trunk control circuit of Fig. 9, via contacts X–11 and X–2, and the lead CFI in the cable 800 to ground through the upper winding of RSA. Relay RSA is normally held operated in this circuit.

Selection control relay CG upon operating, at CG–4 opens the GO–GI chain and locks to lead GI in the usual way, at CG–15 prepares a circuit for relay 4F from the all-trunks busy lead ATB, and at CG–11 and CG–13 prepares circuits for the re-activation of the finder switch. The closure of contacts CG–1 is now without effect, due to the open contacts 65–12.

Relay CH upon operating, closes contacts CH–13 and CH–11 without immediate effect, at CH–16 opens the FB–FC chain, and at CH–4 starts the 1-second timing cycle for GD. Relay CH also, at CH–1 closes a circuit to relay TSA in the trunk control circuit as follows: ground, CH–1, GS–8, make contacts 63–14, 65–8, 64–2 and 61–5, break contacts CUB–8 and RD–12, lead T9 in cables 600, 400, 800 to Fig. 9, make contacts RSA–12, and the winding of TSA to battery.

Relay TSA operating in this circuit, at contacts TSA–1 locks up relay RSA, and at TSA–6 opens another point in the trunk reset circuit, already open at RSA–4. Relay TSA also, at contacts TSA–15, TSA–13, TSA–11 grounds the leads TAF, TRF and TLD leading to the selection controls, and at TSA–3 places direct ground on lead CF1 leading to the first trunk circuit.

The ground on lead TLD is without immediate effect, but the ground on TAF re-operates the finder allotter magnet, by way of make contacts CG–11 and 4C–1, while the ground on lead TRF provides an additional locking circuit for the finder tens and units magnets, by way of make contacts CG–13 and 4C–3. The direct ground on CF1 at the same time is extended over make contacts X–2 and X–11 to the lower winding of relay X in Fig. 8, and also to the lower winding of trunk connect relay 7E, thereby operating 7E and holding X. A third branch of this circuit also extends over rectifier RXP, break contacts S–6 and lead TAR to the allotter magnet corresponding to ARF in the trunk switch, not shown, associated with the first trunk.

Since the allotter magnet is now operated in both the local finder and the trunk switch, the direct locking ground on the tens and units magnets 20F and 0F in the local finder is extended through the contacts 20F–1 and 0F–1 to the corresponding marking leads T20 and UO, and operates the corresponding tens and units magnets in the trunk switch. The calling line and line circuit are thereby connected to the terminals +T, −T, TC and TCX of the first trunk through contacts of the trunk switch corresponding to finder contacts 151–158.

Figure 5:
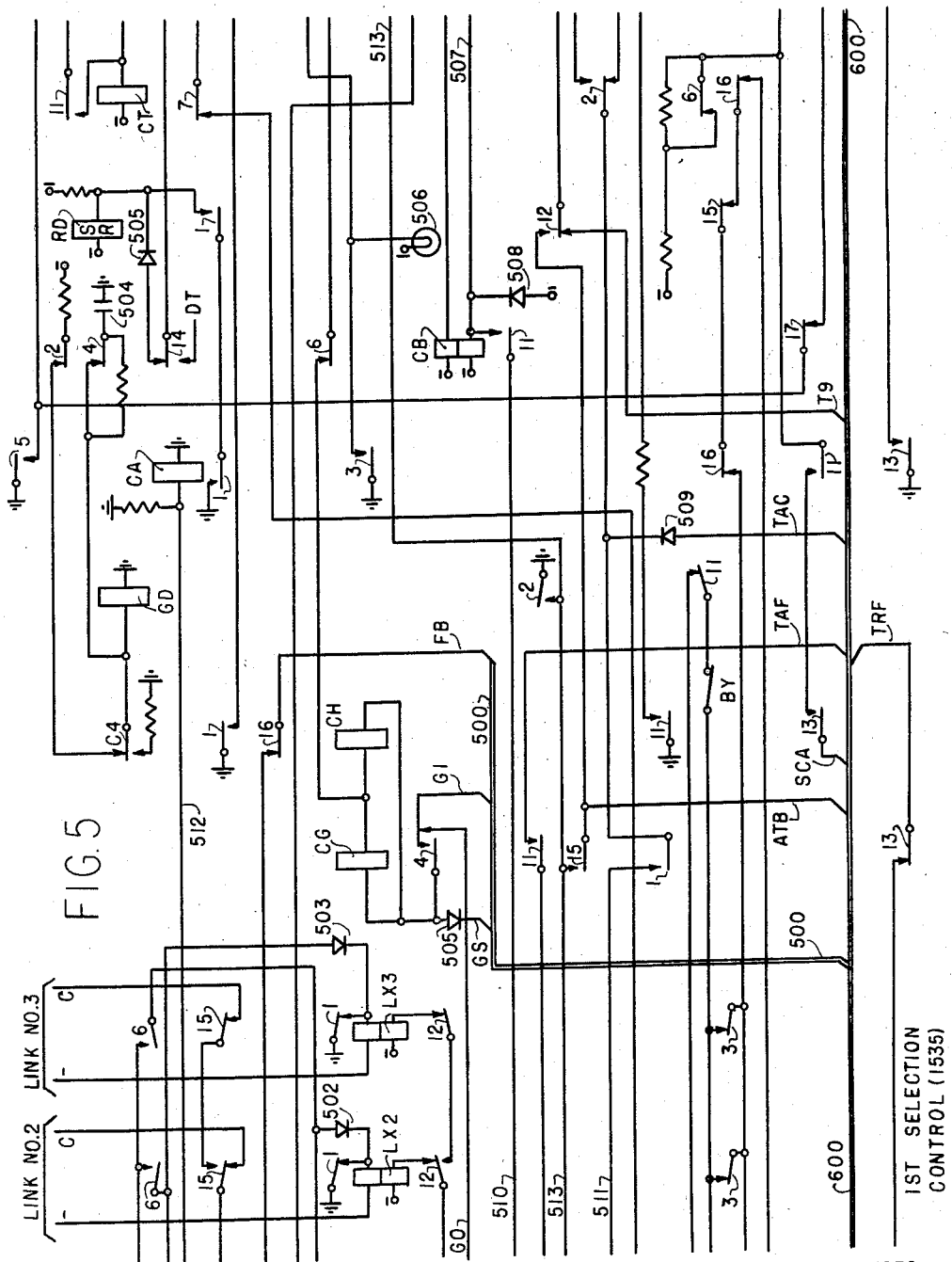
Figs. 5 and 6 show the remainder of the selection control circuit of Fig. 5.

The operation of the tens and units magnets in the trunk switch also extends operate ground through trunk switch allotter magnet contacts corresponding to ARF–1 to the SCA lead in Fig. 5 for the operation of selection control relay GS, via CH–13, CA–11 and GS–2. Relay GS upon operating, at GS–13 operates CT as before from ground at CA–5, at GS–8 removes ground from lead T9 to release TSA, at GS–2 locks to CA–5, and at GS–16 unlocks and releases the counting relays. Relay GS at the same time, at contacts GS–11 now operates link relay 4L from lead TLD in the circuit: ground, TSA–11, lead TLD in cables 800, 400, 600, GS–11, 4C–15, and the upper winding of 4L to battery.

Link relay 4L upon operating, at 4L–1 places an additional ground on link busy lamp 410, at 4L–16 places an additional ground on the calling line cutoff relay CO0, at 4L–18 locks to 4B–4, at 4L–12 disconnects test relay 4E, and at 4L–2 opens the series circuit through link relay 4C and selection control relay CA. Relay 4L further, at break contacts 4L–4 and 4L–14 disconnects relay 4A from the calling line, to start the release of the link and selection control.

Relays 4A, 4C, and CA accordingly release, and relay 4C thereupon disconnects the link circuit from the selection control, releasing the finder allotter magnet ARF, while relay 4A opens the circuit to 4B. Relay 4B releases in turn, after the usual delay, and unlocks and releases 4L. Relay 4L thereupon, at 4L–8 extinguishes the link busy lamp, at 4L–16 removes link ground from the calling line cutoff relay CO0 and 4L–6 removes link locking ground from the link finder tens and units magnet. Due to the open condition of contacts 4B–13 and 4C–3 at this time, the finder tens and units magnets now restore, and complete the release of the link.

In the selection control, relay CA releases after a slight delay, following the operation of link relay 4L and the release of 4C, and at CA–5 and CA–11 opens the operate and locking circuits to relays GS and CT. Relay CA in addition, at CA–3 extinguishes the busy lamp 506, and at CA–16 prepares the reset circuit to CX. Relays CG and CH having released previously, in response to the release of the counting relays, the selection control is now again available for another call, and ready for resetting.

Meanwhile, in the trunk circuit, the operation of relay 7E from TSA–3 has completed the seizure of the trunk, in the following manner. Contacts 7E–15 extend locking ground direct to the trunk switch for locking the operated tens and units magnets therein in the operated position, preparatory to the release of the local link, while contacts 7E–13 for a like reason extend holding ground to line cutoff relay CO0 over the trunk switch test contacts corresponding to 156, 155. Contacts 7E–11 at the same time close a direct circuit through the lower winding of 7F, while 7E–2 and 7E–5 connect the pulse repeating relay 7A to the calling line loop via line contacts corresponding to 152, 154, 151 and 153 in the trunk switch, and line wires 28 and 29.

Trunk relays 7A and 7F accordingly now operate, and condenser 704 charges. Relay 7A thereupon, at contacts 7A–2 closes a direct circuit to 7B, and at pulsing contacts 7A–11 closes the trunk loop to the main exchange, by way of the upper winding of relay 7F, break contacts MH–15 and MH–18, and trunk conductors 901 and 902. Relay 7F at the same time, at make contacts 7F–2 lights the trunk busy lamp 810 over N–7, and at break contacts 7F–2 opens the locking circuit through the upper winding of relay X, now held over its lower winding in multiple with the lower winding of 7E, from ground at TSA–3. Relay 7B on operating, at 7B–2 prepares a circuit for 7C, at 7B–17 removes ground from contacts X–13 and lead RST, and at 7B–12 closes a new circuit for relay 7E, from ground through the upper winding of this relay to battery through the 100 ohm resistor 801.

When therefore, slow relay TSA releases, after a slight delay, following the operation of GS in the selection control circuit, its contacts TSA–3 remove direct ground from the lower winding of X, as well as from the lower winding of 7E, and causes these windings to be dependent on the ground through the 3900 ohm upper winding of RSA. Since the current in this circuit is insufficient to hold X, the latter releases and extends the CFI lead to the next trunk, which now provides holding battery for RSA. The release of TSA also releases the trunk switch allotter magnet, but relay 7E is not affected, since it is now held over its upper winding, as indicated in the preceding paragraph.

Assuming the main exchange to be an automatic exchange the extension of the trunk loop thereto by relay 7A seizes the distant switch train and causes it to return dial tone. The calling subscriber, upon hearing the dialing signal, proceeds to dial the number of the wanted city station, and the distant switch train completes the connection.

In response to the dial pulses, trunk relay 7A releases and re-operates once for each pulse, and at its contacts 7A–11 repeats these pulses to the distant exchange. At the first release of 7A, make contacts 7A–11 open the trunk loop momentarily, make contacts 7A–2 open the circuit to relay 7B momentarily, and break contacts 7A–2 extend ground through 7B–2 to relay 7C, and through 7F–8 to relay 7K. Relay 7C thereupon operates, but 7K, being made slow to operate by the condenser 705, will not operate, since the condenser absorbs the pulse, and discharges instantaneously upon its termination. Relay 7B holds during the brief interruptions its circuit, due to the shunting effect of rectifier RXG. Relay 7C upon operating, at 7C–1 short circuits the upper winding of 7F with a non-inductive resistance, to improve the outward pulsing circuit, and at 7C–13 and 7C–11 prepares operating and locking circuits for relay 8D.

Upon the first re-operation of relay 7A, the circuit to 7B is re-established, and the circuit to 7C is opened, at contacts 7A–2. Relay 7C remains operated however, on the discharge current from condenser 708 which discharges slowly due to the resistance in series with it. Make contacts 7A-2 at the same time pass a pulse of current to relay 8D, by way of the rectifier RXH and contacts 7C-13 and 8D-2. Relay 8D operating in this circuit, at break contacts 8D-14 opens the circuit to 7K, and at make contacts 8D-2 locks to 7C-11.

Relays 7B, 7C and 8D continue to hold during the remaining pulses of the digit, but after the last pulse of the digit, relay 7C releases, after a short delay, and releases 8D. This action is repeated for each subsequent digit. Upon completion of dialing, the distant switch train rings the called city party, and completes the connection when this party answers. Conversation then proceeds, through the condensers 706 and 707. Talking battery is supplied to the calling station through relay 7A, and to the called station by the distant switch train.

*Trunk rotation*

In order to provide substantially equal use of the trunks, these are made available in rotation, by the successive release of their relays X, which advance the CFI lead from trunk to trunk. After all trunks have been used, all of the relays X will be in the normal position, and battery is removed from lead CFI. Control relay RSA accordingly restores, and connects lead T9 to the all-trunks-busy lead ATB. If another trunk call is attempted while RSA is normal the selection ground on T9 will pass over the ATB lead to Fig. 5, and cause the operation of link relay 4F, which will free the selection control and return busy tone, in the manner already explained.

Figure 9:
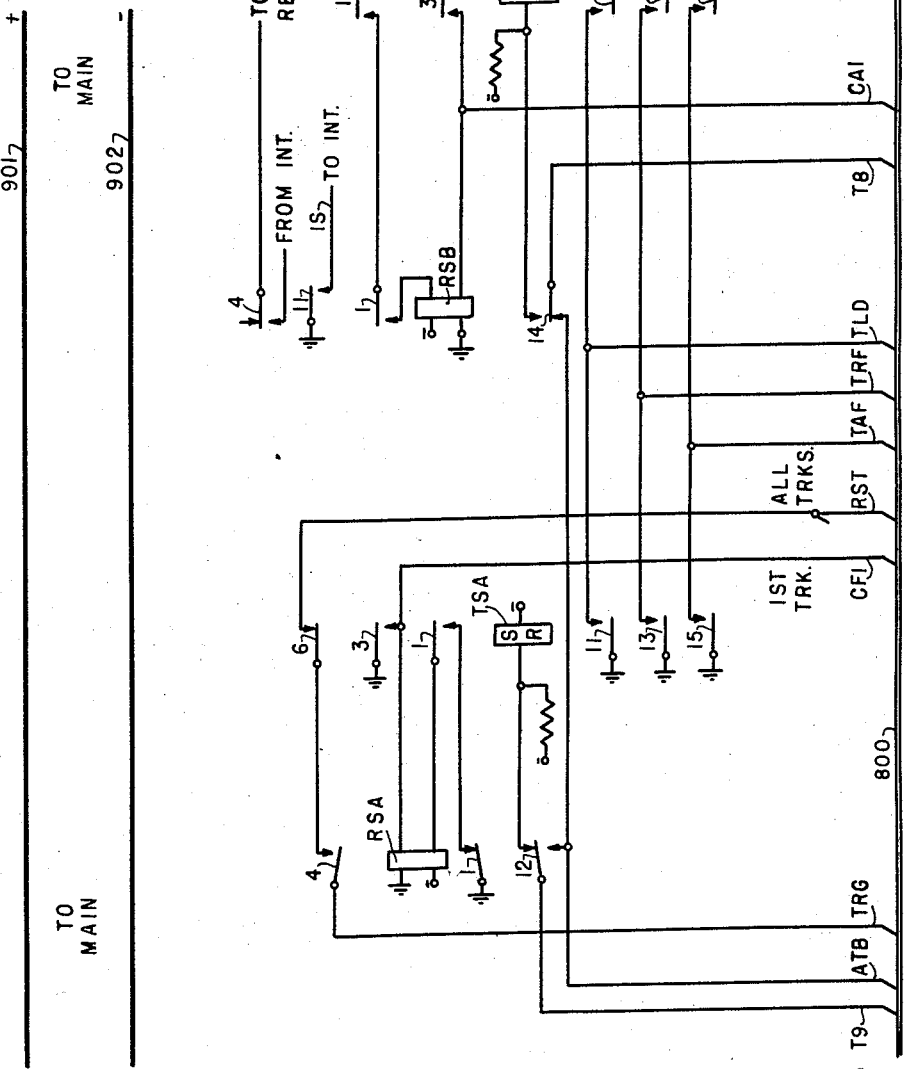

If any of the trunks are now idle, as soon as the finder guard is free, and guard relay TRG re-operated, ground from contacts of TRG on lead TRG passes through cables 400 and 800 to Fig. 9, and thence through break contacts RSA-4 and TSA-6 to lead RST, which is multiplied to the upper winding of X in each trunk. A circuit is thereby completed for the re-operation of the X relays of all trunks now idle, by way of break contacts M-17, 7C-4, 8D-8, 7F-2 and N-7 to battery through 1000 ohms and lamp 810 in multiple. The relays X of these idle trunks thereupon re-operate and lock over X-13 to ground at break contacts 7B-17. The lowest numbered trunk so reset now connects battery from the lower winding of its relay 7E to the CFI lead, thereby re-operating control relay RSA, and clearing the way for further trunk calls.

The relay TRG, as previously noted, is released during the time a selection is being made during a local call, or during the time a trunk is using the allotter bank for a consultation or transfer call. The absence of ground on the TRG lead at such times blocks the resetting of idle trunks momentarily. This arrangement prevents a call from dropping out of one trunk and appearing on another, or appearing on two trunks, if a trunk which precedes the trunk being seized should become idle at the moment of such seizure.

*Restricted service*

If a restricted station, such as station 21 in Fig. 1, attempts to make a trunk call, it will be prevented from doing so by the intervention of selection control relay RD, whose operation was omitted from the description of a local call, as being irrelevant.

Upon the initiation of any call at station 21, following the operation of link relay 4C and the finder tens and units magnets, a circuit is closed to relay RD as follows: ground, LR1-12, jumper 105, finder contacts such as 157 and 158, 4C-13, CT-7, 65-14, 63-2, 62-14, CB-14, rectifier 505, winding of RD, and battery.

Relay RD operates in this circuit and at RD-1 prepares a locking circuit for itself to ground at CA-1 which operates shortly thereafter. Thus, when line relay LR1 is released by the operation of cutoff relay CO1, following the operation of link relay 4B, relay RD is not affected but remains operated. The operation of RD also at RD-15 opens a point in the reset circuit to CX, and at RD-12 disconnects the T9 lead, and prepares a circuit for relay 4F.

If the first digit dialed indicates a local call, or a special service call, the selection control will not interfere, and the call will be allowed to proceed to its normal conclusion. If the first digit should be a "9" however, counting relays 61 to 65 will be found operated at the end of the last pulse, and the relay CB will release shortly thereafter, as previously explained, and cause the operation of relays CG and CH. As soon as CG and CH have operated therefore, a circuit is closed to link relay 4F as follows: ground, CH-1, GS-8, 63-14, 65-8, 64-2, 61-5, CUB-8, RD-12, CG-15, 4C-11, and the upper winding of 4F to battery.

Relay 4F then operates and locks, returns busy tone to the calling party, and releases the selection control, in the manner described for delayed dialing and incomplete selection.

*Inward trunk calls*

When a trunk line, such as the one illustrated, is seized at the central exchange, the normal positive battery maintained on the positive trunk wire 901 at the central office is replaced by negative. This negative causes the operation of trunk relay P, via break contacts MH-12, the lower winding of P, break contacts 7F-12, rectifier RXR, and break contacts 7B-2 and 7A-2 to ground. Relay P in turn operates relay 7C in a direct circuit. Relay 7C thereupon at make contacts 7C-4 lights busy lamp 810 via break contacts 8D-8, 7F-2 and N-7, and at break contacts 7C-4 unlocks and releases relay X to prevent seizure of this trunk, by an outgoing call, and to preselect the next idle trunk.

The central office now rings on the trunk. Relay 8D operates in response, from half cycle current in the circuit: trunk wire 901, thermistor TH, upper winding of 8D, rectifier RXC, condenser 802, trunk wire 902. Relay P is held by the opposite half cycle ringing current in the circuit: trunk wire 901, thermistor TH, rectifier RXD, condenser 802, trunk wire 902.

Relay 8D upon operating, at 8D-2 locks to 7C-11, at 8D-11 starts the interrupter, and at 8D-8 connects flashing ground from the interrupter to busy lamp 810 in place of the steady ground from 7C-4, thereby causing the lamp to flash as an indication of an unanswered inward call. Relay 8D at the same time, at contacts 8D-14 disconnects relay 7K, and at contacts 8D-5 opens the CAO-CAI chain to the succeeding trunks and operates control relay RSB in Fig. 9 in the following circuit: ground through the lower winding of RSB, lead CAI in cable 800 to Fig. 7, break contacts 7F-16, make contacts 8D-5, and the lower winding of relay 7E to battery. Relay 7E does not operate in this circuit however, due to the high resistance of the lower winding of RSB.

The inward call pick up relay RSB upon operating, at RSB-14 prepares a circuit for relay TSB, at RSB-1 prepares a locking circuit for itself, at RSB-11 grounds the interrupter start lead IS, and at RSB-4 connects flashing ground from the interrupter to a signal relay or relays not shown. This causes the intermittent operation of audible and/or visual signals at strategic locations, as required.

Any P.A.B.X station may answer the call, but in practice this task would ordinarily be assigned to one or two individuals who would make the necessary transfers.

Figure 2:
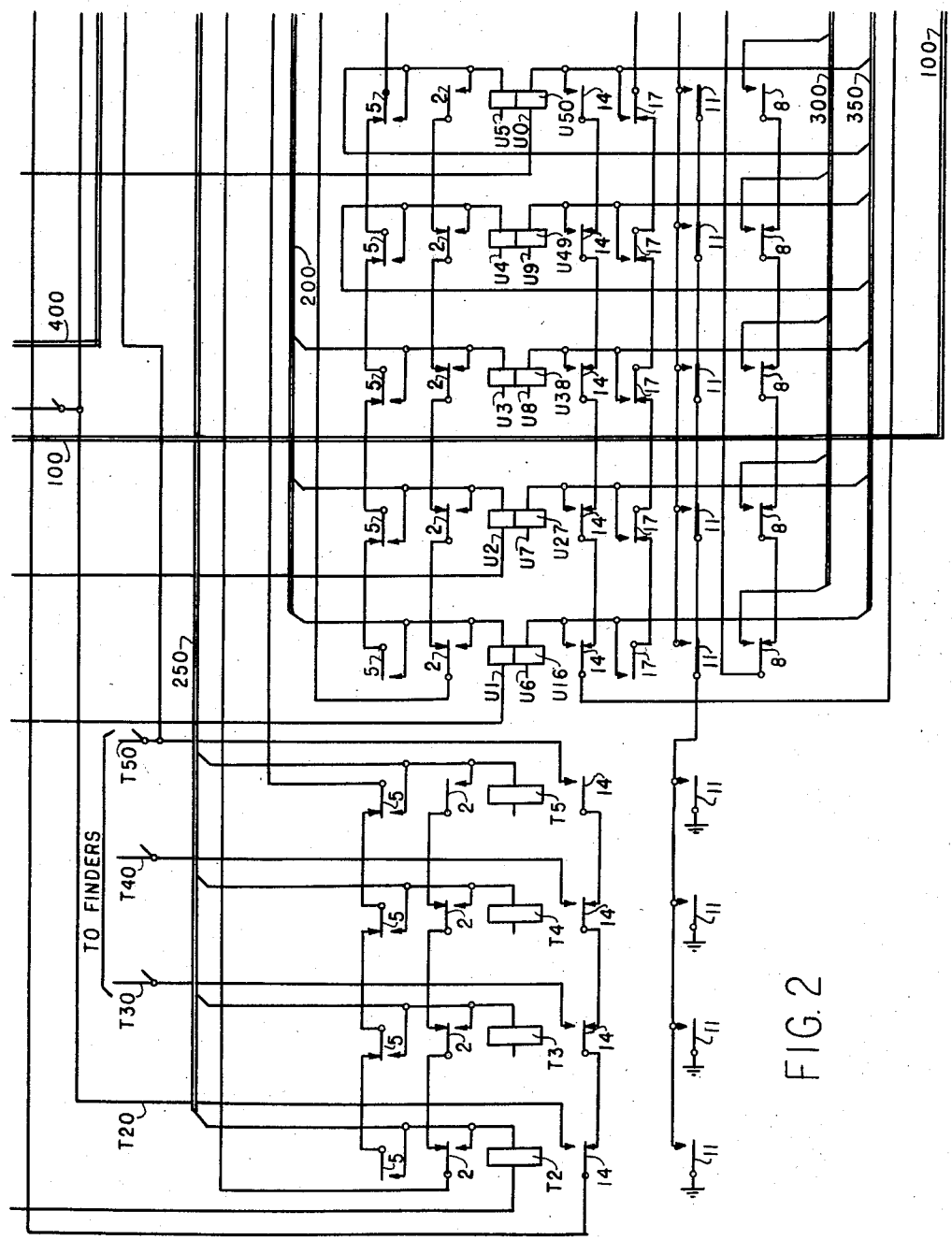
Figs. 2 and 3 illustrate a finder guard circuit which is common to the exchange, and controls the operation of the finders in response to the initiation of a call.

Upon removal of the handset at the answering station, such as the station A in Fig. 1, for example, the finder guard circuit of Figs. 2 and 3 operates to connect this line to an idle local link and selection control in the manner already described. The finder guard circuit then frees itself, leaving the tens and units magnets 20F and 1F operated in the finder switch, relays CO1 operated in the line circuit, relays 4A, 4B, and 4C operated in the link circuit, and relays CA, CB and RD operated in the selection control circuit. If the answer is made from a non-restricted station, relay RD will of course remain normal, but its operation, in the present case, is without effect.

Figure 6:
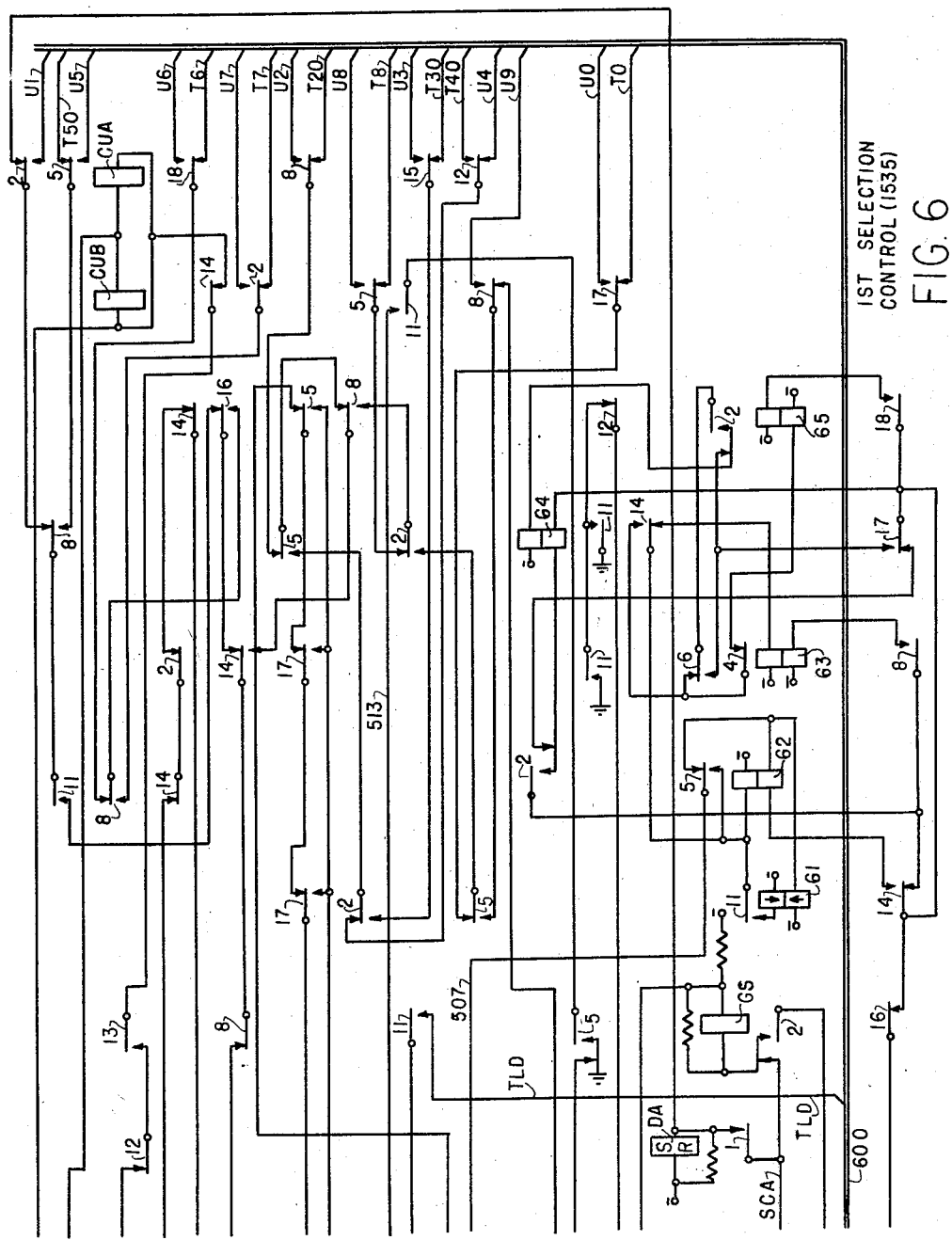

Upon the receipt of dial tone through condenser 408, following the operation of relay CB, the answering station dials the single answer digit, here assumed to be the digit "8." Relay 4A responds accordingly, and passes eight pulses to the counting relays of Fig. 6. The counting relays count off eight steps, in the manner described for an outgoing call, leaving relays 63 and 65 operated, at the end of the last step. Relay CB then releases as before, after a slight delay, following the eighth and last pulse to the counting relays, and at CB–6 operates relays CG and CH in the usual way, from ground through make contacts CA–3 and 63–17 to battery from Fig. 3 over the GO–GI chain.

Relay CG upon operating, at CG–4 opens the GO–GI chain and locks to the finder guard, at CG–15 prepares the all-trunks-busy circuit, and at CG–11 and CG–13 prepares the operation of the trunk switch from the local finder. Due to the open contacts 65–12, the closure of contacts CG–1 is without effect on the local connector at this time, and the allotter magnet of the latter remains at rest.

Relay CH upon operating, at CH–11 and CH–13 prepares the operation of GS, at CH–16 opens the FB–FC chain, and at CH–1 operates relay TSB, via the counting relays, in the following circuit: ground, CH–1, GS–8, 63–14, 65–8, 64–2, CUB–5, lead T8 in cables 600, 400 and 800 to Fig. 9, and through make contacts RSB–14 and the winding of TSB to battery.

Relay TSB upon operating in this circuit, at its contacts TSB–1 locks up RSB, at TSB–3 places direct ground on lead CAI, and at contacts TSB–15, TSB–13, and TSB–11 grounds the leads TAF, TRF and TLD. The ground on TLD prepares the operation of link relay 4L via the now open contacts GS–11, the ground on TRF further locks up the finder tens and units magnets via CG–13 and 4C–3, and the ground on TAF re-operates the finder allotter magnet via CG–11 and 4C–1. At the same time, the direct ground on lead CAI causes relay 7E to operate via contacts 7F–16 and 8D–5, to prepare the seizure of the trunk. This same ground also holds relay X momentarily, over its lower winding, and is extended over lead TAR to the trunk switch allotter magnet, not shown.

Upon the operation of the trunk switch allotter magnet, the operated tens and units magnets of the finder cause the operation of the corresponding tens and units magnets in the trunk switch through the finder and trunk switch allotter magnets, in the manner already explained for an outgoing call, thereby connecting the answering line to the trunk circuit.

Relay GS now operates, in the selection control, from the operate ground for the trunk switch tens and units magnets, via contacts corresponding to ARF–1 and lead SCA in Fig. 7. Relay GS thereupon, at GS–13 again operates relay CT, but this is without significance in the present case, as it was in the case of an outgoing call. Relay GS also, at contacts GS–11 operates link relay 4L from ground on lead TLD, at GS–16 unlocks and releases the counting relays, and at GS–8 opens the circuit to relay TSB which restores after a short delay.

Link relay 4L upon operating, locks to 4B at contacts 4L–18, at 4L–2 opens the series circuit to relays 4C and CA, and at 4L–4 and 4L–14 opens the loop circuit to relay 4A. Relays 4C, CA and 4A thereupon release, and bring about the release of the link and selection control and the local finder, in the manner already described for an outgoing call.

In the trunk circuit, the operation of relay 7E from lead CAI connects relay 7A to the answering line loop by way of the trunk switch, and at 7E–11 closes the circuit to 7F. Relay 7F however, is now shunted by ground through rectifier RXS, and does not operate, at this time. Relay 7E also, at 7E–13 holds the answering line's cutoff relay via the trunk switch, and at 7E–15 locks up the operated tens and units magnets in the trunk switch. Relay 7A operates and operates 7B, at contacts 7A–11 completes the talking circuit from the main exchange to the answering station, and at 7A–2 opens the circuit to the lower winding of P.

Relay 7B upon operating, at contacts 7B–12 energizes the upper winding of 7E to prevent its release, at 7B–17 disconnects ground from the upper winding of X, preparatory to its release, and at 7B–2 opens another point in the circuit of relay P. Relay P now releases, and opens the circuit to C. Relay C releases in turn, after the usual delay, and unlocks and releases 8D. Relay 8D thereupon, at break contacts 8D–5 re-establishes the CAI–CAO chain to the other trunks, and at make contacts 8D–5 removes the shunting ground from 7F, and from the bottom winding of X and lead TAR. Relay 8D at the same time stops the flashing of lamp 810.

Relay X now releases, and extends the CFI lead to the next trunk. The trunk switch allotter magnet also restores. Relay 7F operates, following removal of its shunting ground, and at 7F–16 closes a different circuit for the CAI–COA chain to prevent interference with other incoming calls over other trunks, should it be required to re-operate relay 8D for a transfer of the call. Relay 7F finally, at contacts 7F–2 causes busy lamp 810 to burn steadily at full brilliancy to indicate that the call has been answered.

*Consultation call*

If the calling party, such as the party J, wishes to make a brief consultation call to another P.A.B.X party during the course of a trunk call, he may do so without abandoning the trunk call, in the following manner.

After advising the city party of his intention, so the latter will remain on the connection, the calling party depresses his hookswitch for about ½ second. Relay 7A accordingly releases, and re-operates 7C over make contacts 7B–2. Relay 7K also now operates over 7F–8 and 8D–14, and at 7K–11 closes a shunting circuit around contacts 7A–11, with the aid of contacts 7F–6 and MH–6. The trunk loop is thus re-closed in time to prevent the release of the city switch train. Relay 7B also releases, after some 150 milliseconds or more, and opens the circuit to the upper winding of 7E, which is held momentarily by the charge on condenser 709.

With relay B normal, and 7C and 7K operated, a circuit is now completed for relay M, as follows: ground, make contacts 7K–1 and 7C–15, break contacts S–4, 7B–5, and N–4, and the lower winding of M to battery. An additional ground is furnished to this circuit from 7A–2, by way of contacts 7F–8 and rectifier RXU. Relay M operates, and at M–2 prepares a circuit for the upper winding of N, now shunted by ground on both of its terminals, from S–4 and M–2.

Relay 7A now re-operates, re-operating 7B, and releasing 7K. Relay 7B thereupon, at 7B–12 re-closes the circuit to 7E in time to prevent the latter's release, and at break contacts 7B–5 opens the original operate circuit to relay M. This removes the ground shunt from the upper winding of N, which now operates quickly in series with M from finder guard ground in the circuit: ground, make contacts TA–16 in Fig. 3, lead CG in cables 400 and 800 to Fig. 7, break contacts MH–8, make contacts 7B–5, upper winding of N, make contacts M–2, and the lower winding of M to battery. The circuit through 7F–8 and RXU is now open at break contacts 7A–2. The circuit to 7C being now open at the same contacts, this relay also restores, after its usual delay period, and unlocks and releases 8D.

With relays M and N operated, a 750 ohm shunt 710 is closed by M–5 and N–1 across the link bank line leads M+ and M— in preparation for the seizure of a link. At the same time, make contacts N–7 cause busy lamp 810 to burn at reduced brilliancy to indicate a held call, contacts N–13 connect relay MH to the link bank test lead TM, and make contacts M–11 and N–11 prepare a circuit for relay MG. If a link and a selection control are available, either or both of the selection controls will have ground on lead MG, and if the GO–GI chain is not being held open by another selection, the finder guard circuit will have battery on lead GS. Upon the operation of relay N, in such case, relay MG operates in the circuit: ground, selection control contacts CX–13, lead MG in cables 600, 400, 800, MH–4, M–11, N–11, winding of MG, rectifier RXB, lead GS to Fig. 3, AG–12, TU–2, the GO–GI chain through the trunks and selection controls and back to Fig. 3, and contacts TA–13 to RL battery.

Relay MG upon operating, at MG–11 grounds the link bank extra-control lead TXM to mark this call as restricted and hence limited to local connections, at MG–16 opens the FC–FB chain to block incoming calls momentarily, at break contacts MG–2 opens the GO–GI chain momentarily, and at make contacts MG–2 locks to RL battery on lead GI1. Relay MG at the same time, at MG–13 shunts relay TA in the finder guard to time the selection, since relay TU does not operate on a call back, and at MG–4 and MG–6 marks the tens and units leads corresponding to this trunk, such as T60 and U1 in the link finder allotter banks, over leads MT and MU. Relay MG finally at MG–8 grounds the FA start lead to the selection controls.

Start ground from the FA lead passes through make contacts CX–4 of the appropriate selection control, and thence through contacts such as LX–15 to relay 4C of the link assigned to the call, and relay 4C operating, connects the link to the selection control. Contacts 4C–1 thereupon pass the start ground through rectifiers 404 and 406 to the lower winding of link relay 4A, and over lead 405 to allotter magnet ARF in the associated finder switch. The allotter magnet operates, and connects up the tens and units magnets. Ground on the trunk leads MT and MU then operates tens magnet 60F and units magnet 1F, which prepare their locking circuits, and close the crossbar contacts corresponding to the first trunk. Trunk leads M+ and M— are now connected to the link leads 455 and 456 over switch contacts such as 151, 153, 152, 154, whereupon relay 4A is energized over both of its windings due to the 750 ohm shunt placed across leads M+ and M— by trunk relays M and N. At the same time, trunk lead TM is connected through contacts such as 155 and 156 to link lead 457, while trunk lead TXM is connected through contacts such as 157 and 158 to link lead 458. Since lead TXM is now grounded at MG–11, restriction relay RD in Fig. 8 operates, via 4C–13, CT–7, counting relay contacts, and CB–14.

Link relay 4A operates at approximately the same time as 4C, and closes a circuit for 4B in series with trunk relay MH as follows: ground, 4A–12, upper winding of 4B, finder contacts 156, 155, lead TM to Fig. 8, N–13, and the winding of MH to battery. Relay MH will not operate in this circuit, but 4B, operates, and at 4B–11 connects direct ground to finder contacts 156 and to relay MH, causing the latter to operate. Relay 4B at the same time at 4B–13 locks up the finder tens and units magnets, and at 4B–7 causes the operation of relays CA and CB in the selection control.

Relay MH upon operating, at MH–8 disconnects lead CG from the holding circuit of M and N, since the selection has been successfully completed, and connects its own ground to M and N. Relay MH also, at MH–4 releases MG, which reestablishes the FC–FB and GI–GO chains through the trunks, and removes ground from the FA, TA, MT and MU leads, to release relay CX and the link finder allotter magnet ARF. Relay MH further, at MH–12 connects a 250 ohm resistor across the outgoing end of the trunk to hold the switch train at the main exchange, at MH–6 disables the shunting circuit for contacts A–11, at contacts MH–15 and MH–18 connects the upper winding of relay 7F across the M+ and M— leads, and at MH–2 disconnects the 750 ohm resistor 710 from across these same leads.

If no link is free when relays M and N operate, the extension of the call will be delayed, but relays M and N will hold to the ground on the finder guard lead CG, and as soon as a link is available, relays MG and MH will operate as described. If a link is available, but fails to complete its connection with the trunk, so that MH does not operate, the ground from MG–13 on lead TA will be maintained, and will eventually cause the release of finder guard relay TA. Contacts TA–16 thereupon remove ground from lead CG to which relays M and N have locked. This causes the release of M and N and MG, and re-closes the GO–GI and FB–FC chains. The call thus remains connected to the trunk, with only trunk relays 7A, 7B, 7E and 7F operated. The link is also released, and TA is re-operated, upon the release of M, N and MG, and the calling party is made aware of the failure by the absence of dial tone. He thereupon will repeat the attempt, by again flashing the hookswitch.

Assuming however that the equipment performs normally the call will proceed, following the operation of relay MH as follows.

Trunk relay 7A is now held as before over the calling line loop, via contacts 7E–2 and 7E–5. Link relay 4A, on the other hand, is now held over the inner section of the trunk loop, via contacts L–4 and L–14, leads 456 and 455, contacts corresponding to 152, 154, 151 and 153 in the link finder switch, leads M+ and M— to Fig. 8, make contacts MH–15 and MH–18, the upper winding of relay 7F and pulsing contacts 7A–11.

Dial tone is now returned from the selection control to the calling party over this connection, via contacts 4C–13, lead 407 and condenser 408, and thence through the link finder to leads M+ and M— and the trunk, where it passes readily through condensers 706 and 707 to leads +T and —T and thence through the trunk switch to the telephone station 20. The party J then dials the number of the party he wants to consult. Relay 7A follows the pulses, operates 7C and 8D as before, and at 7A–11 repeats these pulses to link relay 4A. Relay 4A repeats them in turn to the counting relays of the selection control, which cause the link connector switch to complete the local connection in the same manner as for a regular local call. And when the called station answers, the two local stations are connected together through the trunk switch and the link finder and connector in tandem. The selection control is then freed in the usual way. Talking battery is supplied to the calling station through relay 7A as for the trunk call, and to the called station through link relay 4A and the connector, with the talking circuit extending through the trunk-line condensers 706 and 707.

At the conclusion of the consultation call, the calling party J can return to the trunk call by again depressing the hookswitch momentarily. Relay 7A again releases, and re-operates 7C and 7K, and releases 7B. The release of 7A has no effect on link relay 4A however, since the called party is requested to stay on the line for a moment, so that 4A remains held over the called line loop.

Upon the release of 7B however, with 7C and 7K operated, a circuit is closed to M and N as follows: ground, 7K–1, 7C–15, S–4, 7B–5, through N–4 and the lower winding of N to battery, and through M–1 and the upper winding of differential relay M to battery. A branch of this circuit also extends through the upper winding of N and contacts M–2 to the lower winding of M and battery. Relay M releases and closes a holding circuit to 7C and N from the link as follows: ground from link contacts 4B–11, contacts 156, 155 of the link finder, lead TM, make contacts N–13 break contacts M–14, through rectifier RXE and the winding of 7C to battery, and through rectifier RXF and contacts S–4, 7B–5 and N–4 to the lower winding of N and battery. Relay MH of course, also holds in this circuit, from contacts N–13.

Upon the re-operation of relay 7A, relays 7B and 8D re-operate and 7K releases. Relay 7B thereupon at 7B–12 re-closes the circuit to 7E in time to prevent its release, and at 7B–5 opens the holding circuit to N. Relay N then releases, and at N–13 opens the holding circuit to MH and 7C. Relay MH then releases, and after an interval relay 7C also restores, and releases 8D. The release of MH disconnects the calling party J from the link and reconnects him to the trunk call, and at the same time disconnects the 250 ohm holding resistance from the outgoing end of the trunk. The original talking circuit between party J and the city station is now re-established, and the interrupted conversation is resumed.

If the party making the consultation call wishes to return to the trunk call only momentarily and then go back to the consultation call, he may do so without re-dialing in the following manner.

First of all, he will tell the other local party of his intentions and request him to remain on the line. This will prevent the release of the link, so that the associated finder and connector tens and units magnets will remain operated. He then flashes the hookswitch and returns to the trunk in the manner just described.

When now, the first party is ready to go back to the consultation call, he has only to again flash his hookswitch. This releases relays 7A and 7B and re-operates 7C, 7K and M as before. Relays 7A and 7B then re-operate as before, to release 7K and re-operate N. Contacts N–13 and N–11 now close the circuits of relays MH and MG simultaneously. Since the circuit through MH is to direct battery, while that through MG is to resistance battery RL in Fig. 3 and since MG is also made sluggish, relay MH operates first, from the link ground on lead TM, and at MH–4 opens the circuit to MG and prevents the latter's operation. Relay MG is thereby prevented from initiating the seizure of another link. The operation of MH on the other hand, transfers the conversation path from the trunk connection to the previously seized link, over leads M+ and M−, and the consultation is resumed. This operation may be repeated indefinitely, with the original party switching back and forth between the two other parties at will by a mere flashing of the hookswitch. Should the second party hang up by mistake he can still be reached again by dialing.

*Call transfer*

If, during the course of a trunk call, either inward or outward, the local party wishes to transfer the trunk call to another local station, he may do so by proceeding exactly as for a consultation call, by flashing the hookswitch and dialing through a local link while holding the trunk. Then, when the called local station answers, the first party requests him to remain on the line to pick up the call, and then hangs up.

Upon the restoration of the handset at the calling local station, trunk relay 7A again restores, re-operating 7C and 7K. Relay 7B then releases, and again energizes both windings of differential relay M, and causes its release, while MH, 7C and N are held by the ground from the link on lead TM as before. Now however, since 7A and 7B do not re-operate, relay 8D remains normal, and 7K remains operated from the ground through break contacts 7A–2, make contacts 7F–8 and break contacts 8D–14. Due to the failure of 7B to re-operate, also, contacts 7B–12 do not re-close the circuit to the upper winding of relay 7E, and the latter releases after an interval, under the control of condenser 709.

Relay 7E upon releasing, at 7E–2 and 7E–5 disconnects the trunk line from the trunk switch, at 7E–11 opens the circuit to the lower winding of 7F, and at 7E–13 and 7E–15 releases the line cutoff relay CO0 and the trunk switch tens and units magnets. Relay 7F releases after a delay, under the control of condenser 704, and opens contacts 7F–8 to release 7K. Since the local link is still being held by the second or called local station, the release of 7F also, at 7F–14 closes a circuit to relay S as follows: ground, 4B–11, finder contacts 156, 155, test lead TM, N–13, M–14, 7F–14, winding of S, rectifier RXA, lead GS to Fig. 3, AG–12, TU–2, the GO–GI chain, and back to Fig. 3 and contacts TA–13, and RL battery.

Relay S operates in this circuit, and at contacts S–2 and S–12 opens the GO–GI and FB–FC chains. Relay S also, at S–4 opens the locking circuit of N, at S–8 reconnects battery through resistor 801 to the upper winding of 7E, at S–6 re-operates the allotter magnet corresponding to ARF, in the associated trunk switch, and at S–16 grounds the SCA lead to the connector of the held local link preparatory to the re-operation of the trunk switch. Relay S further, at S–14 closes a holding circuit for S through rectifier RXV, from the ground on lead TM, and connects the same ground to lead TXM through rectifier RXW. This ground thereupon passes through finder contacts corresponding to 157, 158 of the held local link, relay contacts 4E–3, lead AR, and the winding of the connector allotter magnet ARC in the held local link to battery.

The connector allotter magnet ARC accordingly operates, and at ARC–1 extends the direct ground on the SCA lead from S–16 to the locking springs of the connector tens and units magnets. The operated tens and units magnets in the connector thereupon extend this ground to the corresponding tens and units operate leads. Since these operate or marking leads are multiplied to the other switches and since the trunk switch allotter magnet is now re-operated, the corresponding tens and units magnets of the trunk switch operate and connect the second local station to the trunk circuit leads +T, −T, while still connected to the local link through the link connector switch.

Meanwhile N has released due to the operation of S, and releases MH. Relay N also opens the holding circuit to 7C at N–13 but S remains locked to lead TM through contacts S–14. Relay 7E operates at approximately the same time, at 7E–15 locks up the trunk switch tens and units magnets, at 7E–13 extends holding ground to the transfer line's cutoff relay, at 7E–11 re-operates 7F, and at 7E–2 and 7E–5 re-operates relay 7A over the transfer line loop.

Relay 7F upon operating, at 7F–2 re-lights busy lamp 810 at full brilliancy, at 7F–14 opens another point in the operate circuit of S, and at 7F–4 connects ground from S–18 to lead TXC. This ground accordingly passes through contacts corresponding to 158, 157 of the trunk switch to the extra control lead XC of the transfer line, and thence through connector contacts 167 and 168 which are still closed, and through rectifier 412 to the upper winding of link relay 4E, now locked to contacts 4B–1. The upper winding of 4E being now shunted by ground on both its terminals, relay 4E releases, and at contacts 4E–16 and 4E–18 disconnects relay 4A from connector contacts 162 and 164 and the transfer line. Relay 4A then releases and starts the release of the link.

In the trunk circuit, the re-operation of relay 7A re-operates 7B, and also 8D, since 7C has not yet restored. The release of MH now removes the 250 ohm holding resistor from the trunk, and substitutes the upper winding of F and contacts 7A–11, completing the talking connection between the local transfer station and the city station at the same time. Upon the release of the local link, ground is removed from lead TM, and relay S restores. And when relay C releases, following its normal delay period as determined by condenser 708, relay 8D also releases. The transfer is now complete, and may be repeated as often as desired, in the same manner.

Code call

The code call equipment can be seized from any local station by dialing a single digit call number, such as "7," and any station having an assigned code call signal number may be paged by dialing the corresponding two-digit number to the code call equipment following such seizure. With the arrangement illustrated, these numbers may consist of any combination of the digits "1" to "6" inclusive, thus providing a total of 36 two-digit code numbers.

When the calling party removes the handset, the finder guard circuit seizes a link and selection control, and the latter operates the finder switch of the seized link in the manner previously described. Following this operation we find link relays 4A, 4B and 4C again operated, together with selection control relays CA and CB. In the code call equipment of Figs. 10, 11 and 12 we also find control relay RSC normally operated over lead TL, from ground through break contacts 10D–18, 10B–14, and 10C–15.

Upon the return of dial tone, from contacts CB–14 of the selection control, the calling party dials the code call seizure digit "7." The counting relays of the selection control thereupon count off seven steps, leaving relays 61, 62, 65 operated, and 63 and 64 normal. Upon the release of relay CB in the usual way, following the last pulse, selection control relays CG and CH operate as before, from ground through CA–3 and 61–17, and relay CH operates code call control relay TSC via the counting relays 61–65 in the circuit: ground, CH–1, GS–8, 63–14, 65–16, 62–8, CUB–2, lead T7 to Fig. 12, RSC–4, and the winding of TSC to battery.

Relay TSC operates in this circuit, and at TSC–1 and TSC–3 grounds the TAC and TLD leads to the selection control. Relay TSC at the same time grounds the tens and units leads MT and MU, which are assumed to be cross-connected to the tens and units marking leads T70 and U1 respectively. The ground on lead TAC operates the connector allotter magnet ARC by way of rectifier 509, contacts CG–1, 4C–17, and lead AR. The connector tens magnet 70C and the units magnet 1C, not shown, accordingly operate, through the allotter bank, from the marked MT and MU leads, and lock to resistance ground at 4B–15. This same ground was extended to relay GS in Fig. 6 over lead SCA upon the operation of ARC without effect. Upon the operation of the tens and units magnets however, direct ground therefrom is passed to lead SCA and causes GS to operate.

Relay GS now locks to CA, at GS–16 releases the counting relays 61–65, at GS–13 operates CT from CA–5, at GS–11 operates link relay 4L from the TSC ground on the TLD lead and at GS–8 removes CH ground from lead T7 to release relay TSC. Relay CB re-operates in response to the release of the counting relays, and releases CG and CH. Relay CG releases the connector allotter magnet, and CB unlocks and releases GS. And upon the release of GS, relays CUA and CUB operate in series with CT in the manner already described.

Meanwhile, the operation of relay 4L in the link circuit has disconnected relay 4E at break contacts 4L–12, to block the ringing, and at make contacts 4L–4 and 4L–14 extends the calling line loop to the code call terminals +C and —C, via contacts corresponding to 162, 164, 161, 163 in the connector. Relay 4L at the same time, at break contacts 4L–4 and 4L–14 disconnects battery feed relay 4A from the calling line loop, at contacts 4L–16 places an additional holding ground on the calling line cutoff relay, and at 4L–18 locks to 4B–4. Relay 4L finally, at 4L–6 and 4L–8 connects additional locking grounds to the finder and connector tens and units magnets, and at 4L–2 releases relay 4C and the selection control. Relay 4A releases, at the same time as 4C and opens the circuit to 4B. Relay 4B then releases, and at 4B–4 transfers the locking circuit of 4L to the code call circuit and lead CC therein by way of test contacts corresponding to 166, 165 in the connector.

In the code call circuit, battery feed relay 10A operates, over leads +C and —C and the calling line loop, following the operation of 4L, and operates relay 10B in obvious manner. Relay 10B in turn, at 10B–1 grounds lead CC, to maintain the holding circuit for 4L following the release of 4B, and at break contacts 10B–14 opens the circuit to control relay RSC, which releases. Relay 10B also, at make contacts 10B–14 operates relay 10E over the following circuit: ground, 10C–15, 10B–14, lead 1001 to Fig. 12, contacts C4–8, C2–14, C3–15, C1–14, and 10D–15, and the lower winding of 10E to battery. Relay 10E thereupon, at 10E–4 closes a point in the signal circuit, at 10E–14 prepares a holding circuit to its own upper winding, at 10E–1 short circuits the winding of 10F, and at 10E–11 shunts contacts G–12 and H–12.

The calling party now dials the code of the wanted party, which will be assumed to be "16" in the present instance. Battery feed relay 10A follows the pulses, and in response to the first digit "1" releases and re-operates once. Contacts 10A–1 thereupon open the circuit to 10B briefly, but this relay, being made slow to release, holds its armature.

Figure 12:
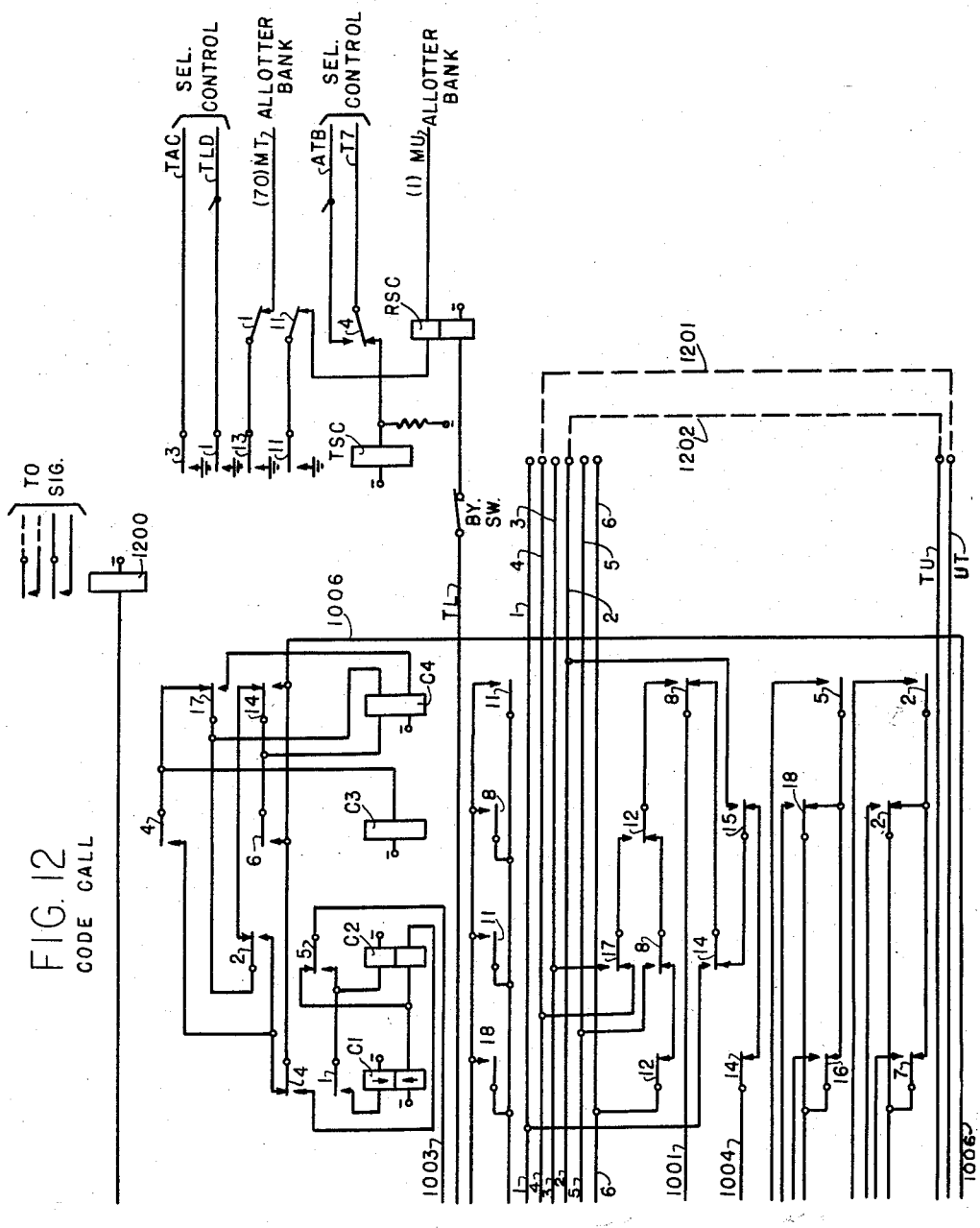

The release of relay 10A also, at contacts 10A–12 passes a pulse of current to the counting relays over the following circuit: ground, 10C–15, 10B–14, 10D–12, 10E–14, 10A–12, lead 1003 to Fig. 12, contacts C2–5, the lower winding of counting relay C1, and battery. A portion of this pulse also passes into the upper winding of slow-to-release relay 10E to maintain this relay operated momentarily. Counting relay C1 operating in this circuit, at contacts C1–1 prepares its own release, and at C1–4 prepares a circuit for relay C2, now shunted by ground on both sides of its lower winding. Relay C1 also at contacts C1–14 opens the circuit to the lower winding of 10E.

The re-operation of relay 10A opens the pulsing circuit to 10E and C1. This starts the release of 10E under control of condenser 1006, and removes the ground shunt from the lower winding of counting relay C2. Relay C2 accordingly operates in series with C1, and locks the latter operated, in the following circuit: ground, contacts 10C–15 and 10B–14, leads 1001 and 1002, contacts 10E–11, G–12 and H–12 in parallel, lead 1006, make contacts C1–4, and the lower windings of C2 and C1 in series to battery.

Relay 10E now restores, after an appropriate delay period, following the removal of the pulse, and at break contacts 10E–14 operates the tens register relay 1T. This circuit is from ground through contacts 10C–15, 10B–14, 10D–12, 10E–14, lead 1005, H–15, C1–7, and the lower winding of 1T to battery. Relay 1T thereupon, at contacts 1T–1 locks its upper winding to the same ground on conductor 1001, and at 1T–11 operates relay G from the ground on conductor 1001 in Fig. 12 through break contacts C4–8, make contacts C2–14, make contacts 1T–11, and break contacts 2T–14, 3T–14, 10D–5, and H–2 to battery through the upper winding of G.

Relay G upon operating, at contacts G–4 prepares a circuit to the upper winding of H, now shunted by ground on both its terminals, and at G–12 unlocks and releases the counting relays C1 and C2. And upon the release of relay C2, its contacts C2–14 remove shunting ground from the upper winding of H. Relay H accordingly operates in series with G, and locks the latter operated from the ground on conductor 1001 through make contacts G–4 to battery through the upper windings of G and H. The release of C1 on the other hand, causes break contacts C1–14 thereof to re-connect ground from lead 1001 to lead 1004, thereby re-operating relay 10–E.

In response to the second digit "6," relay 10A releases and re-operates six times, and passes six impulses to the counting relays, and on the first pulse, counting relays C1 and C2 operate in sequence, as before, and lock over leads 1006, 1002, 1001.

Upon the second release of 10A, the pulse of ground on pulsing lead 1003 passes through make contacts C2–5 and C1–1 to the upper windings of C1 and C2 in parallel. Relay C2 is held, since its windings are connected to aid each other, but relay C1 is released, since its windings are connected in opposition to each other. Relay C3 then operates, from the ground on lead 1006, via break contacts C1–4, make contacts C2–2, and break contacts C4–17. And upon the re-operation of relay 10A, the removal of ground from pulsing lead 1003 releases relay C2, which is held only over its upper winding following the release of C1. Relay C4 now has ground from lead 1006 on its left terminal, through make contacts C3–6, and also on its right terminal, through C3–6 and break contacts C4–14 and C2–2.

Upon the third release of 10A, relay C1 re-operates and prepares the circuit to C2, and when 10A re-operates relay C2 operates in series with C1 as before. Relay C2 thereupon, at break contacts C2–2 removes ground from the right hand terminal of relay C4, which then operates in series with C3, from ground on lead 1006 through make contacts C3–6, the upper winding of C4, break contacts C4–17 and relay C3 to battery, with a parallel path also extending to C3 via make contacts C2–2 and C3–4. Relay C4 upon operating, at make contacts C4–14 and C4–17 closes an alternative circuit for itself with both its windings energized in series, and at break contacts C4–17 prepares the release of C3 by opening its portion of the parallel path extending to C3. The continued operation of C3 is thus made dependent on the relays C1 and C2.

Upon the fourth release of relay 10A, the reappearance of the pulse ground on lead 1003 forces the release of differential relay C1 as before, whereupon break contacts C1–4 close an alternative holding circuit for relay C3 through make contacts C3–4, in addition to the circuit through make contacts C3–6, the upper winding of C4, and make contacts C2–2 and C3–4. The re-operation of 10A then removes the pulse ground from lead 1003 and the upper winding of relay C2, and the latter also releases. This opens the second holding circuit to C3, whose continued operation is now dependent on break contacts C1–4.

Upon the fifth release of relay 10A, relay C1 re-operates and releases C3, and upon the re-operation of 10A, relay C2 operates and again locks C1 in series with it.

The sixth release of 10A then releases C1 again, and on the final re-operation of 10A, relay C2 likewise releases, and leaves only C4 operated.

The following table shows the counting relays found in the operated position at the end of each impulse.

| Impulses | Relays | Operated |
| --- | --- | --- |
| 1 | C1, C2 | |
| 2 | | C3 |
| 3 | C1, C2 | C3, C4 |
| 4 | | C3, C4 |
| 5 | C1, C2 | C4 |
| 6 | | C4 |

Following the sixth and last impulse relay 10E releases as before, after the usual delay, and at break contacts 10E–14 operates the units register relay 3U. The circuit for 3U is from ground through 10C–15, 10B–14, 10D–12, 10E–14, lead 1005, make contacts H–15, break contacts C1–16 and C3–18 in parallel, make contacts C4–5, and the lower winding of 3U to battery. Relays C4, 1T and 3U are now in the operated position.

The register relays 1T–3T and 1U–3U operate in a different combination for each digit. The complete series of possible combinations, the circuits for which may now be easily traced, are shown in the following table.

| Digit | Tens Reg. | Units Reg. |
| --- | --- | --- |
| 1 | 1T | 1U. |
| 2 | 2T | 2U. |
| 3 | 1T, 2T | 1U, 2U. |
| 4 | 2T, 3T | 2U, 3U. |
| 5 | 1T, 3T | 1U, 3U. |
| 6 | 3T | 3U. |

Upon the operation of register relay 3U, a circuit is completed through contacts of the counting and register relays to the lower winding of differential relay G, as follows: ground on lead 1001, contacts C4–8, C3–12, C2–8, C1–12, 1U–6, 2U–4, 3U–14, 10D–8, H–8, G–1, and the lower winding of G to battery. A branch of this circuit also extends from contacts H–8 to the lower winding of H. Both relays now have both windings energized. Relay H, whose windings assist each other, holds, but relay G, whose windings oppose each other, is caused to release.

Relay G upon releasing, at break contacts G–7 closes a circuit to relay 11K as follows: ground on lead 1001, contacts G–7, H–18, 11L–4, 1T–3, 3U–4, and the winding of 11K to battery. Relay G also at make contacts G–4 opens the circuit through the upper windings of G and H and at make contacts G–1 opens the circuit to the lower winding of G. Relay G furthermore, at make contacts G–12 opens the locking circuit to the counting relays, thereby causing the release of relay C4.

Relay 11K operates, in response to the closure of its circuits, and at 11K–1 and 11K–4 closes locking circuits for itself, through 11L–4, H–6 and G–4. Relay 11K also, at contacts 11K–11 places an additional ground on lead 1001, and at 11K–13, 11K–7 and 11K–16 prepares signal and sequence circuits.

The release of counting relay C4, which occurs at about the same time as the operation of relay 11K, opens the holding circuit to the lower winding of H at make contacts C4–8, but relay H being slow to release, holds its contacts for a moment. Meanwhile, contacts C4–11 disconnect the upper winding of G to prevent its re-operation upon the release of H, contacts C4–5 open the operate circuit of register relay 3U now locked, with 1T, to lead 1001, and break contacts C4–8 close a circuit to the lower winding of 10E over leads 1001 and 1004, and break contacts C2–14, C3–15, C1–14 and 10D–15. Relay 10E accordingly operates, and short circuits relay 10F, at contacts 10E–1.

Relay H now releases, and at contacts H–18 operates relay 10D, from the ground on lead 1001 extended through contacts 11K–1. Relay 10D upon operating, at 10D–12 locks direct to lead 1001, at 10D–15 disconnects direct ground from the lower winding of relay 10E and substitutes ground through a very high resistance, to make this relay release slowly. Relay 10D also, at contacts 10D–5 and 10D–8 further prepares the sequence circuits, and at 10D–2 connects ground from lead 1002 to relay 10F, by way of break contacts G–12 and H–12, in parallel with contacts 10E–11. This ground is without effect however, due to the shunt maintained on 10F by relay 10E.

Upon the eventual release of 10E however, relay 10F operates, but only after a short delay period, since it is made slow to operate, as by the use of a copper sleeve or slug on the core. Relay 10F thereupon, at 10F–1 closes another point in the signal circuit and at 10F–11 re-operates relay 10E, over its upper winding. A branch of this circuit also extends over lead 1003 to counting relay C1, which also operates.

Relay 10E upon operating, at contacts 10E–4 operates signal relay 1200 from ground at 11K–13, and relay 1200 causes the signal bells, not shown, to ring once for the first digit of the code. Relay 10E also, at contacts 10E–1 partly short circuits relay 10F. Relay 10F thereupon releases slowly and opens the circuits to relays 10E and C1, and the signal relay. The opening of the circuit to signal relay 1200 causes this relay to release, but the opening of the circuit to counting relay C1 causes the operation of C2, in the manner already explained, and relays C2 and C1 lock to lead 1006 as before. Relay 10E is held momentarily, by the condenser 1006.

Counting relay C2 upon operating, re-operates relay G in the circuit: ground on lead 1001 in Fig. 12, break contacts C4–8, make contacts C2–14 and 1T–11, break contacts 2T–14 and 3T–14, make contacts 11K–7, break contacts 11L–7, make contacts 10D–5, break contacts H–2, the upper winding of G, and battery.

Relay G upon operating, at contacts G–4 prepares the operation of relay H, at G–7 prepares the operation of relay 11L, at G–1 prepares its own release, and at G–12 releases the counting relays. The counting relays thereupon open the operate circuit to G, which enables H to operate in series with G as before, over their upper windings, from ground on conductor 1001 through make contacts G–4.

Relay H upon operating, at contacts H–6 closes another holding circuit for relay 11K, and at H–18 operates relay 11L from ground on lead 1001 over make contacts 11K–1, H–18, and G–7. Relay 11L in turn, at 11L–7 and 11L–16 shifts the sequence circuits, at break contacts 11L–4 opens one of the locking circuits to 11K, and at make contacts 11L–4 and 11L–1 closes multiple locking circuits for itself.

Relay 10E now restores and removes the short circuit from 10F which re-operates from ground on lead 1002, by way of make contacts G–12, H–12 and 10D–2. Relay 10F in turn re-operates relays 10E and C1. The signal relay 1200 is not affected by the re-operation of 10E and 10F, due to the now open break contacts G–15, and the signal bells remain silent, to mark the pause betwen the digits of the signal code. Relay 10E then shunts down 10F as before, and the latter again opens the circuit to C1 and 10E. Relay C2 thereupon operates and holds C1, while 10E releases, after the usual delay.

The release of 10E again enables the re-operation of 10F, which re-operates 10E, and releases counting relay C1 which operates C3, in the manner already described. Relay 10E then shunts down 10F as before, whereupon counting relay C2 is released, followed shortly after by the release of 10E.

The release of counting relay C2, at the end of the second step of the counting relays, closes the release circuit for differential relay G. This circuit is from ground on lead 1001 in Fig. 12, through break contacts C4–8, and C2–14, make contacts C3–15, jumper 1202, lead TU, make contacts 11K–16, 11L–16, 10D–8, H–8 and G–1 to the lower winding of G and battery. Relay G accordingly releases due to its oppositely energized windings, and at G–12 releases the operated counting relay C3. This opens the holding circuit through H–8 to the lower winding of H, and relay H also releases.

Interrupter relay 10F now re-operates to start the units code, re-operating relays 10E and C1, and relays 10F and 10E continue to operate and release in the previously described manner, until the counting relays have counted off six steps. Signal relay 1200 operates, at each operation of 10F and 10E and causes the signal bells to ring six times for the second digit of the code.

At the conclusion of the fifth operation and release of relay 10F, counting relays C1, C2, and C4 are left operated, as indicated by the chart. The sixth operation of 10F then releases C1, and the sixth release of 10F releases C2, leaving only counting relay C4 operated.

With counting relays C1, C2 and C3 normal and C4 operated, a circuit is now completed for the re-operation of relay G. The circuit for G is now from ground on lead 1001 in Fig. 12 through make contacts C4–8, break contacts C3–12, C2–8, C1–12, 1U–14 and 2U–14, make contacts 3U–14, 11L–7, and 10D–5, break contacts H–2, and the upper winding of G to battery.

With relay H normal and 11L operated, the only holding circuit for relay 11K is through break contacts G–4, and with relays H and 10E normal, the only holding circuit for counting relay C4 is through break contacts G–12. The operation of G therefore, causes the release of relays 11K and C4, while 11L remains held through make contacts 11L–1 and G–7. The release of C4 opens the operate circuit to the upper winding of G, which also removes the shunt from H, and the latter operates in series with G as before. This closes an additional holding circuit for 11L, through make contacts 11L–1, H–18, and 11L–4.

With relay 10E normal and G and H operated, ground from lead 1002, passing through make contacts G–12, H–12 and 10D–2 now starts the relays 10F and 10E on a new cycle of operation, to mark the pause between the first and second sounding of the code signal. This continues until the counting relays have counted off four steps.

At the conclusion of the fourth step of the counting relays, with 10F and 10E again normal, we find counting relays C3 and C4 operated, and C1 and C2 normal. A circuit is accordingly completed for the release of relay G as follows: ground on lead 1001 in Fig. 12, make contacts C4–8 and C3–12, break contacts C2–17, jumper 1201 and lead UT, break contacts 11K–16, make contacts 11L–16, 10D–8, H–8 and G–1, and the lower winding of G to battery. Relay G accordingly releases, but H holds over its lower winding as before.

Relay G upon releasing, at G–12 unlocks and releases the counting relays, at G–4 and G–1 opens the circuits to both of its windings, and at G–7 opens one of the holding circuits to 11L. Relay 11L is now held over make contacts 11L–4, H–18, and 11L–1. The release of the counting relays now opens the circuit to the lower winding of H. Relay H then restores, and at H–18 unlocks and releases 11L.

Relay 10F now re-operates, via break contacts G–12 and H–12 and make contacts 10D–2, to start a new stepping cycle, which continues until the counting relays have counted off four more steps, leaving C3 and C4 again operated and C1 and C2 normal. Relay G then re-operates from lead 1001 over make contacts C4–8 and C3–12, break contacts C2–17, jumper 1201 and lead UT, break contacts 11K–7 and 11L–7, make contacts 10D–5 and break contacts H–2 to the upper winding of G. Relay G thereupon prepares the circuit to H, and releases the counting relays. Relay H then operates as before in series G and holds the latter operated.

With G and H again operated, relay 10F starts a new counting cycle, which continues for another four steps. The lead UT is then again grounded through the counting relays, and this ground is now extended through break contacts 11L–16 and make contacts 10D–8, H–8 and G–1 to the lower winding of G. This causes G to release due to the nullifying effect of the current in its two windings, while H is held as before over its lower winding.

With relays G and 11L normal and H still operated, relay 11K now re-operates from the ground on lead 1001, via break contacts G–7, make contacts H–18, break contacts 11L–4, and make contacts 1T–3 and 3U–4, to mark the beginning of the second code cycle. The release of G also releases the counting relays, which in turn remove ground from the UT lead to release H. Relay 10F thereupon re-operates and initiates a new signal cycle, exactly like the first, and these operations continue until the called party answers or the calling party hangs up.

It is thus seen that the interval between the tens and units digits of the code is two steps of the counting relays, as determined by the jumper 1202, while the interval between repetitions of the code is three times four or twelve steps of the counting relays, as determined by the jumper 1201. It will also be evident that the interval between digits may have any value from 1 to 6 steps of the counting relays, depending on the location of the jumper 1202, while the interval between codes may equal any value from 3 to 18 steps of these relays, in multiples of three, depending upon the location of the jumper 1201.

The sequence relays found operated, at the beginning of each of the preceding operations, is indicated by the following table.

| Operation | Relays Operated | | |
|---|---|---|---|
| Tens dialing | | G, H | |
| Units dialing | 10D | | 11K |
| Tens code signal | 10D | G, H | 11K, 11L |
| Digit interval | 10D | | 11K, 11L |
| Units code signal | 10D | G, H | 11L |
| Signal interval (1) | 10D | | |
| Signal interval (2) | 10D | G, H | |
| Signal interval (3) | 10D | G, H | |

Figure 10:
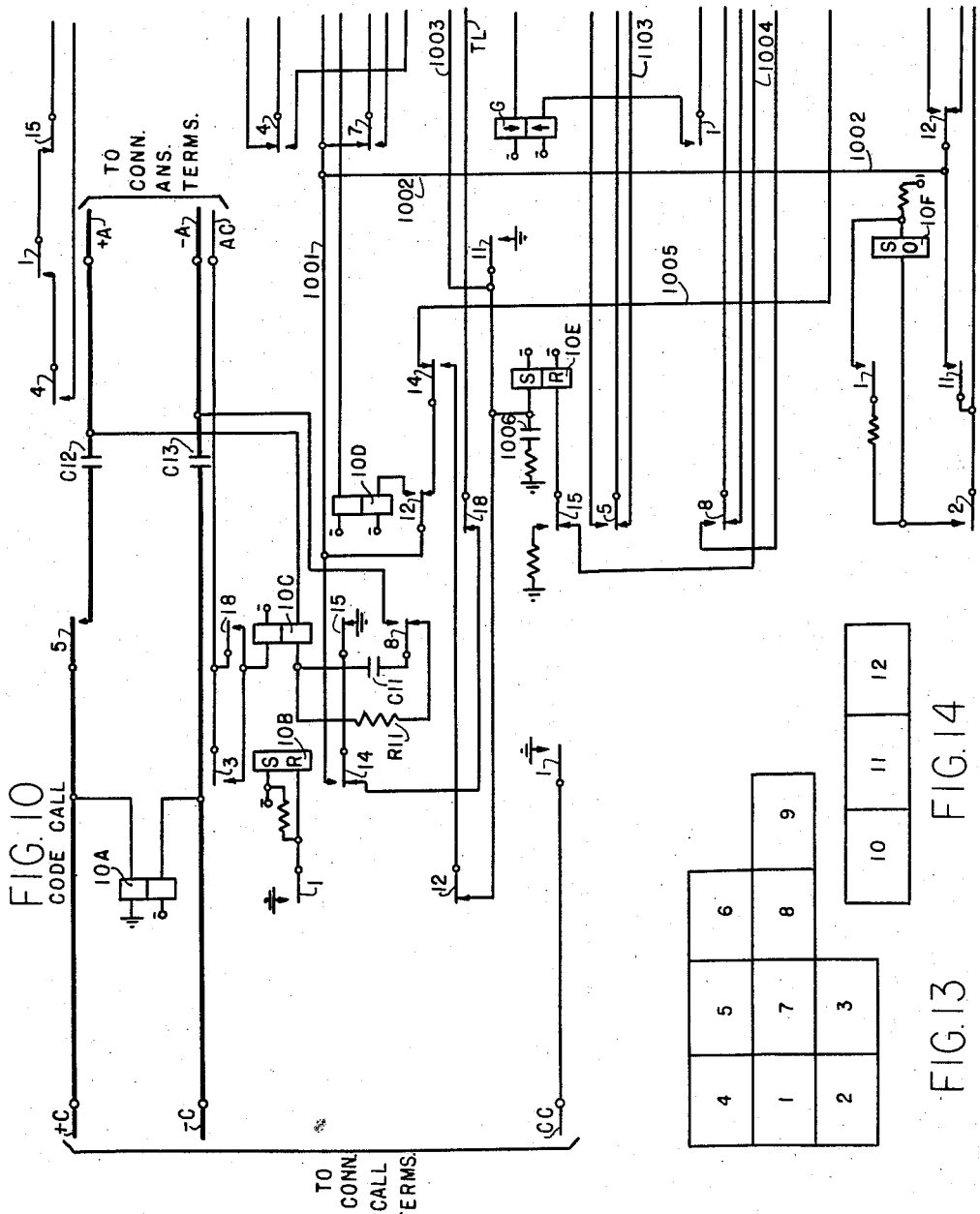
Figs. 10, 11 and 12 show the code call circuits.
Figure 11:
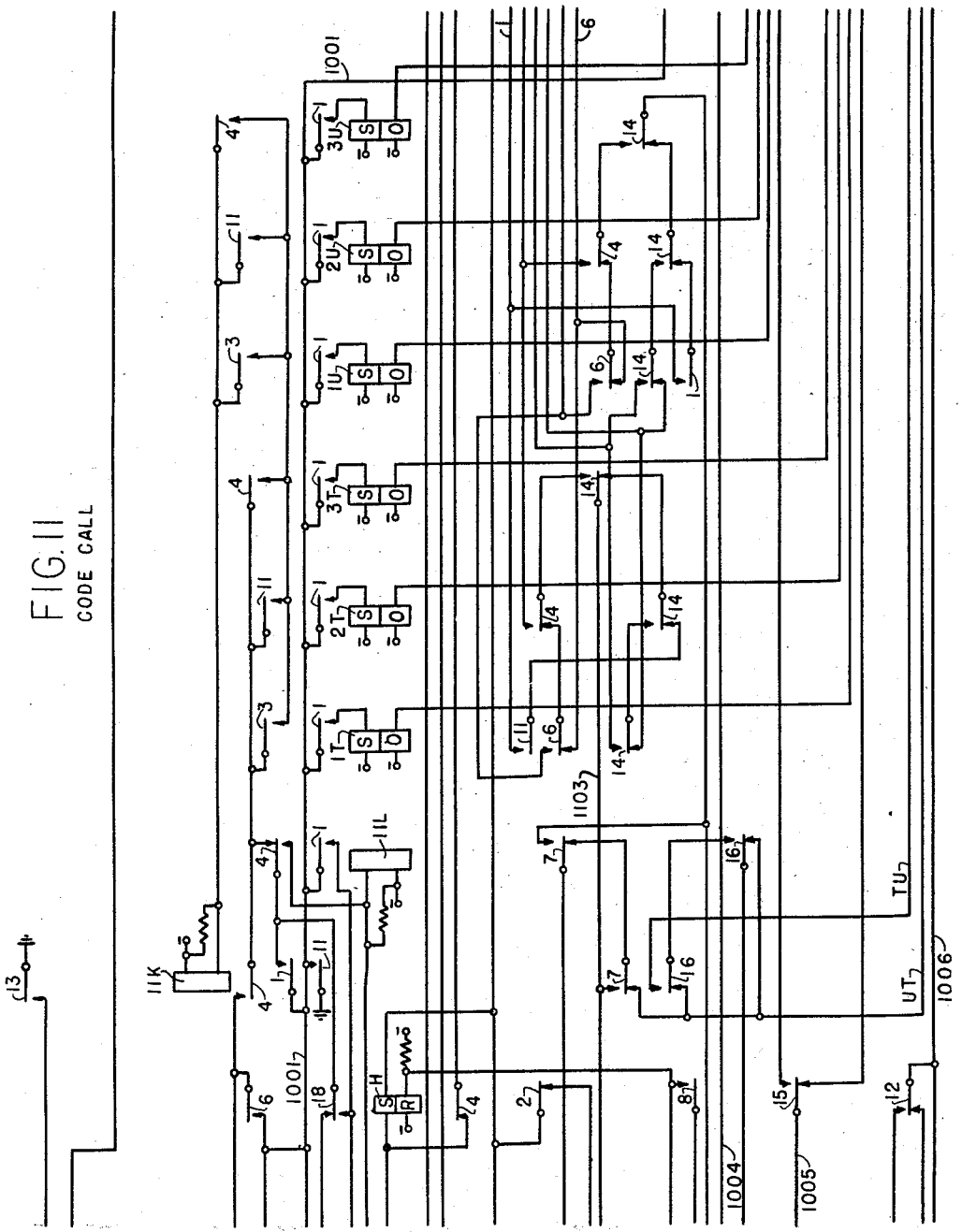

The called party, on hearing his code, may answer from any convenient station, by dialing the assigned 2-digit answer number here assumed to be "31." It is also assumed that the answer leads +A, −A and AC at the upper right in Fig. 10 terminate at the terminals 31 of the connector switches, thus preventing the assignment of these terminals to a local station.

Upon removal of the handset at the answering station, the finder guard seizes a link and selection control. The associated finder switch then operates to connect the answering line to the link and selection control, leaving the relays 4A, 4B, 4C, CA and CB again operated therein. Upon receipt of dial tone the answering party then dials the digits "31." In response to the first digit "3" the counting relays of the selection control count off three steps, leaving relays 61, 62, 63 and 64 operated and 65 normal. Relay CB then releases, and operates CG and CH. Contacts CG–1 then operate the connector allotter magnet ARC, while contacts CH–1 operate the connector tens magnet 30C, not shown, over break contacts GS–8, make contacts 63–14, break contacts 65–8, make contacts 64–5 and 61–2, break contacts CUA–15, and lead T30. Relay GS then operates from the connector in the usual way, releases the counting relays, and operates CT. The counting relays then release CG and CH and the connector allotter magnet, and re-operate CB. Relay CB in turn releases GS, whereupon relays CUA and CUB operate in series with CT, as before.

In response to the second digit "1" of the answer number, counting relays 61 and 62 alone operate. Relay CB then releases, and re-operates CG and CH. Relay CG then re-operates the connector allotter magnet ARC, while CH operates the connector units magnet 1C not shown, over break contacts GS–8, 63–14, and 65–16, make contacts 62–11, break contacts 64–8, make contacts CUA–2, and lead U1.

Upon the operation of the connector units magnet, the answering line is connected to the code call answer leads +A and −A over switch contacts corresponding to 162, 164, 161, 163, while test relay 4E in the answering link is connected to the code call lead AC via connector contacts corresponding to 166, 165. The connector units magnet at the same time re-operates GS over the SCA lead, and the latter in turn at GS–5 operates the link's ringing relay 4F via contacts CUB–11 and 4C–11. Relay 4F prepares the ringing circuit, locks to 4B, and at 4F–16 releases relays 4C and CA to free the selection control.

Link relay 4E also operates at approximately the same time as 4F in the following circuit: ground, lower winding of 4E, contacts 4L–12, connector test contacts corresponding to 166, 165, code call lead AC, contacts 10B–3, and the upper winding of relay 10C to battery. Relay 4E locks to 4B, at 4E–5 extends direct ground to the upper winding of 10C, and at 4E–14, 4E–16 and 4E–18 further prepares the ringing circuit.

Answer relay 10C now operates, from the direct ground from 4E–5, and at contacts 10C–18 locks direct to lead AC. Relay 10C also, at 10–15 removes locking ground from leads 1001, 1002 and 1006 to release all operated relays in the code call circuit except 10A, 10B and 10C, at break contacts 10C–8 disconnects the discharge resistor R11 from condenser C11, and at make contacts 10C–8 completes the ringing circuit. The initial rush of charging current to the 100 microfarad condenser C11 over the ringing circuit causes a corresponding current flow in the lower winding of relay 4F, which as before explained, forms one terminus of the ringing circuit. Differentially wound relay 4F is thereby caused to release, and at 4F–2 and 4F–5 opens the ringing circuit, and completes the talking circuit.

The calling and answering parties are now connected together over the following circuit: the calling telephone, the calling line, finder contacts such as 151, 153, 152, 154 in the calling link, make contacts 4L–4 and 4L–14, connector contacts such as 162, 164, 161, 163 in the calling link, leads +C and −C, make contacts 10C–5, talking condensers C12 and C13, leads +A and −A, contacts corresponding to 161, 163, 162, 164 in the connector of the answering link, contacts such as 4E–16, 4E–18, 4F–2, 4F–5, 4L–4 and 4L–14 in the answering link, contacts corresponding to 152, 154, 151, 153 in the finder of the answering link, and the answering line and telephone. Talking battery for the calling line is furnished from relay 10A of the code call equipment, while the answering line receives its talking battery from relay 4A of the answering link.

If the call is expected to be short, it may be completed over this connection. If it is expected to require more than a very short time however, it is preferable that the calling party ask for the number of the answering station, ask the answering party to hang up and wait, and then hang up also and call this number.

As soon as the calling party hangs up, the circuit to relay 10A is opened. Relay 10A accordingly releases, and releases 10B. Relay 10B upon releasing after a slight delay, at 10B–1 breaks the locking circuit through break contacts 4B–4 and make contacts 4L–18 to the lower winding of relay 4L in the calling link. Relay 4L thereupon releases, and releases the line cutoff relay of the calling line to prepare the line for the new call.

As soon as the answering party hangs up, relay 4A of the answering link releases, and releases 4B. Relay 4B then unlocks and releases 4E in the answering link, releases the line cutoff relay in the answering line, and unlocks and releases 10C in the code call circuit. Relay 10C then shunts the condenser C11 with the resistor R11, and the condenser discharges quickly. Both lines and both links and the code call are now normal and ready for further action. The release of the code call relays 10C, 10A and 10B of course, causes the re-operation of the code call control relay RSC in Fig. 12.

What is claimed is:

1. In a relay automatic telephone system employing finder-connector links of the crossbar type for extending connections between calling and called lines, a guard circuit and a pulse responsive circuit common to said links for controlling the finders and connectors thereof to complete said connections, tens and units marking relays for said guard circuit, a set of tens marking leads controlled by said tens relays and two groups of units marking leads controlled in pairs by said units relays, a pair of group precedence relays, means responsive to the initiation of a call from any line for operating a tens and a units relay corresponding to the tens and units digits of said line's call number in series with the precedence relay corresponding to the group rating of said units digit, means responsive to said series operation for operating the finder of an idle link from the tens and units marking leads controlled by said operated relays to thereby switch the calling line through said finder to said pulse responsive circuit, chain circuits for said tens and units relays for giving precedence of operation to said relays in a given order in case of simultaneous calls involving different tens and units relays, and means for at times making one or the other of said precedence relays slower to operate than its companion relay to give precedence to the corresponding group of units marking leads in the case of simultaneous calls involving the same tens and units relays but different groups of said units marking leads.

2. In a telephone system as in claim 1, means for releasing said guard circuit responsive to completion of said finder switching operation, a timing relay for said guard circuit, means for operating said timing relay in case said guard circuit fails to release promptly, and relay means operated in response to each such timing relay operation for alternately making each of said precedence relays slower to operate than the other, to reverse the group order of preference for said units marking leads in response to each such failure.

3. In a telephone system as in claim 1, first normally effective chain circuits for said groups of tens and units marking relays for fixing their order of operation in one direction, second normally ineffective chain circuits for said groups of tens and units relays for fixing their order of operation in the reverse direction, a precedence shift relay for said guard circuit having a normal and an operated position, means for alternating the position of said shift relay responsive to any failure of a finder to switch through promptly, and contacts on said shift relay operated responsive to each such reversal for reversing the effectiveness of said chain circuits to reverse said order of operation responsive to each said failure.

4. In a telephone system as in claim 1, a shunting resistor for slowing said precedence relays and normally connected to one of them, two sets of chain circuits for said marking relays, each set adapted to fix the order of operation of said relays in a different direction from the other but only one set normally connected for action, a timing relay and a precedence shift relay for said guard circuit, means for operating said timing relay responsive to failure of any finder to switch a call through promptly, means for alternately operating and releasing said shift relay responsive to successive operations of said timing relay, and contacts operated responsive to each such change of position of said shift relay for reversing the connections of said resistor and said chain circuits to thereby reverse the order of operation of said precedence relays and of said tens and units marking relays and prevent blocking of other calls.

5. In a branch exchange telephone system employing finder-connector links for extending calls between calling and called lines, a pair of selection control circuits common to said links, crossbar switches for said links, tens and units magnets for said switches, marking leads, an allotter in each switch for connecting all of the magnets thereof to said marking leads at each operation of said allotter, means responsive to the initiation of a call from any line for operating the allotter in the finder of an idle link and for operating a tens and units magnet in said link via said marking leads and said allotter to connect the calling line to said link and to one of said selection controls, pulse receiving means in said selection control operated by impulses received over said connection for operating the allotter in the connector of said link and for operating a tens and a units magnet in said connector via said marking leads and said allotter to interconnect the calling and called lines via said link, chain circuits enabling the operation of only one of said allotters at a time, and chain circuits for causing said selection controls and said links to be seized by calls in rotation.

6. In a telephone system as in claim 5, a timing relay in each selection control, circuit means in each selection control for operating said relay within a given time after seizure by a calling line in case a first series of impulses for operating said connector tens magnet is not received within said time, and for also operating said relay within said given time after cessation of said first series in case a second series of impulses for operating said connector units magnet is not received within said time, circuit means in each selection control for operating said relay within a shorter time following the cessation of each said series of impulses in case said connector tens and units magnets fail to operate in said shorter time, and means in each selection control operated responsive to said operations of said timing relay for freeing said selection control from said link and causing said link to give a busy signal to said calling line.

7. In a telephone system as in claim 5, a normally operated timing relay in each selection control, a timing condenser, means in said selection control for causing said condenser to release said relay in case a tens series of impulses is not received within a given time following seizure of said selection control, means in said selection control for causing said condenser to release said relay responsive to failure of said connector tens magnets to complete the tens selection within a given time following said impulses, means in said selection control for causing said condenser to release said relay in case a units series of impulses is not received within a given time following said tens series, means in said selection control for causing said condenser to release said relay responsive to failure of said connector units magnets to complete the units selection in a given time, means operated responsive to any release of said relay for freeing said selection control from said link, and means in each selection control for causing said condenser to release said relay in a shorter time responsive to said failures of said tens and units selection operations.

8. In a branch exchange telephone system having finder-connector links for extending calls between calling and called lines and between said lines and trunks, crossbar switches for said links and trunks, tens and units magnets for each switch, tens and units marking leads common to said switches, an allotter in each switch for connecting the magnets thereof to said marking leads, means responsive to the initiation of a call for operating the allotter in the finder of an idle link and for operating tens and units magnets in said finder via said common leads and said allotter to connect the calling line to said link, pulse receiving means operated by impulses received over said connection for operating the allotter in the connector of said link and for operating tens and units magnets in said connector via said common leads and said allotter to interconnect calling and called lines via said link, means including said pulse receiving means operated responsive to impulses received over said first connection and representing a common answer digit assigned to the answering of incoming trunk calls by local stations for seizing the trunk employed by such incoming call, means operated responsive to such seizure for operating the allotter of the associated trunk switch and re-operating the finder-allotter, and means whereby the operated tens and units magnets of the finder are thereby caused to operate corresponding magnets in the trunk switch via both said allotters and said common leads to thereby connect the answering line to said trunk via said trunk switch.

9. In a telephone system as in claim 8, an inward call relay common to said trunks, means for operating said relay from said pulse receiving means responsive to receipt thereby of said common answer digit, and means operated responsive to said relay operation for seizing said calling trunk and for causing said operations of the involved finder and trunk switch allotters and of the appropriate trunk switch magnets over said common marking leads to connect said answering line to said trunk.

10. In a branch exchange telephone system employing finder-connector links for extending calls between calling and called lines, trunks, crossbar switches for said links and trunks, tens and units magnets in each switch, marking leads common to said switches, an allotter in each switch for connecting the magnets thereof to said marking leads, means for operating the magnets of the finder and connector of an idle link via said marking leads and the associated allotters under control of a calling line to connect said calling line to a called line via said link, pulse receiving means for said links, an outward call relay common to said trunks, means for operating said relay from said last means responsive to pulses representing a common trunk call digit received thereby during the making of a trunk call by a calling line, means responsive to said relay operation for seizing an idle trunk and for operating the allotter of the associated trunk switch and that of the finder employed in the call, and means whereby the operated magnets in said finder are thereby rendered effective to operate corresponding magnets in said trunk switch to connect the calling line to said trunk via said trunk switch and independently of said link.

11. In a telephone system as in claim 10, chain circuits for said trunks to cause said trunks to be taken for use in rotation, and chain circuits for said links and trunks to block false connections and interference between calls by preventing the simultaneous operation of the allotters of two finders, of two connectors, of a finder and a connector, and of two trunk switches.

12. In an automatic telephone system comprising a plurality of finder-connector links and a plurality of trunks, a crossbar finder switch and a crossbar connector switch for each link and a crossbar trunk switch for each trunk, tens and units magnets for said switches, means operated responsive to the initiation of a call on a line for operating corresponding tens and units magnets in an idle finder to connect the calling line to the associated link, means operated responsive to impulses representing the call digit of another of said lines received over said connection for operating the appropriate tens and units magnets in the associated connector to connect the calling and called lines via said switches, means operated responsive to impulses representing a single digit trunk call number received over said first connection for causing said operated finder magnets to operate corresponding magnets in the trunk switch of an idle trunk to connect the calling line to said trunk via said trunk switch and release said link, means operated responsive to a momentary interruption in said calling line for causing said trunk to operate appropriate tens and units magnets in the finder of a idle link to connect said line to said link via said trunk and finder switches to enable said calling line to call a second local line without freeing the trunk, and means for releasing said link and returning said calling line to said trunk responsive to a second momentary interruption in said line.

13. In a telephone system as in claim 12, means operated responsive to a prolonged interruption in said calling line while connected to said called line via said trunk switch and said finder and connector switches for causing the release of the operated tens and units magnets of said trunk switch, and for then causing the operated tens and units magnets of the connector to operate tens and units magnets corresponding thereto in said trunk switch to thereby connect said called line to said trunk via said trunk switch, and means operated responsive to said last connection for releasing said finder and connector switches.

14. In an automatic telephone system comprising a plurality of finder-connector links and a plurality of trunks, a crossbar finder and a crossbar connector for each link and a crossbar trunk switch for each trunk, tens and units magnets for said switches, means responsive to the initiation of a call on any line for operating corresponding tens and units magnets in an idle finder to connect said line to the associated link, means operated responsive to impulses representing a common single-digit trunk answer number received over said connection for causing said operated finder magnets to operate corresponding tens and units magnets in the trunk switch of a trunk seized by an incoming call, to thereby connect said line to said trunk via said trunk switch and release said link, means operated responsive to a momentary interruption in said line for causing said trunk to operate tens and units magnets corresponding to said trunk in the finder of an idle link to connect said line to said link via said trunk switch and said last operated finder, and impulse receiving means in said link operated responsive to impulses representing the call number of another line received thereby over said last connection for operating the corresponding tens and units magnets of the associated connector to interconnect said lines via said three switches.

15. In a telephone system as in claim 14, means operated responsive to a prolonged interruption in said first local line while connected to said second local line via said trunk switch and said finder and connector switches for releasing the operated tens and units magnets of said trunk switch and for then causing the operated tens and units magnets of said connector to re-operate tens and units magnets corresponding thereto in said trunk switch to connect said second local line to said trunk via said trunk switch, and means operated responsive to said last connection for releasing said link.

16. In an automatic branch exchange system comprising local lines and trunks and finder-connector links for establishing local connections, a crossbar finder switch and a crossbar connector switch for each link and a crossbar trunk switch for each trunk, tens and units magnets for said switches, means whereby any of said lines may be connected to any of said trunks via the associated trunk switch, means operated responsive to a momentary control signal exercised over such a trunk connected line for causing the connected trunk to operate tens and units magnets corresponding to said trunk in the finder of an idle link to connect said line to said link via said trunk switch and said finder, pulse receiving means associated with said link operated responsive to impulses representing the call number of a second local line received thereby over said last connection for operating the appropriate tens and units magnets of the connector of said link to interconnect said lines via said trunk switch, said finder, and said connector, and means operated responsive to retirement from said connection by said first local line for releasing said operated tens and units magnets in said trunk switch, and for causing the operated tens and units magnets of said connector to operate tens and units magnets corresponding thereto in said trunk switch to connect said second local line to said trunk via said trunk switch.

17. In a telephone system as in claim 16, a single set of tens and units marking leads for said system for operating said tens and units magnets, an allotter magnet for each switch for connecting the tens and units magnets thereof to said marking leads momentarily incident to their operation from said marking leads, chain circuits enabling the operation of only one allotter magnet at a time under ordinary conditions, means for releasing said allotter magnets promptly following the operation of the associated tens and units magnets, and means for re-operating the allotter magnets of a finder and a trunk switch or of a connector and a trunk switch to enable said operation of said trunk switch magnets from said finder and connector magnets over said common marking leads incident to said trunk call transfer operation.

18. In a telephone system as in claim 5, a code call circuit having calling and answer terminals, means including said control circuit pulse receiving means operated responsive to impulses representing a common single-digit code call seizure number received thereby from said calling line for disabling said calling link's ringing circuit and for operating the appropriate tens and units magnets in said link's connector from said marking leads to connect said calling line to said code calling terminals, code call signal means, means in said code call circuit operated responsive to further impulses received thereby over said last connection for operating said signal means to signal a wanted local party who may seize an idle link and said control circuit from any line, means including said control circuit's pulse receiving means operated responsive to impulses representing a common two-digit code call answer number received thereby from said answering line for operating the appropriate tens and units magnets in the connector of the answering link from said marking leads to connect said answering line to said code call answer terminals and to said calling line.

19. In a branch exchange telephone system comprising a plurality of lines and a plurality of links for interconnecting said lines, a relay code call circuit, code call signal means, means for connecting any one of said lines to said code call circuit via one of said links under control of said line for initiating a code call, counting relays and a relay interrupter for said code call circuit, tens and units register relays and a group of sequence relays for said code call circuit, pulse receiving means for said code call circuit operated responsive to impulses representing a two-digit code call signal number received over said connection for stepping said counting relays to successively set said tens and units register relays in any one of a number of combinations in accordance with the value of the received digits, means including said sequence relays for then starting said interrupter and for causing said interrupter to step said counting relays in a plurality of successive cycles, and means jointly controlled by said sequence and counting relays for causing said signal means to sound the digits of the code signal as fixed by said register relays, for measuring the interval between the tens and units signals, for repeating said signals, and for measuring the interval between said signal repetitions.

20. A code call circuit as in claim 19, wherein said interrupter, said sequence relays, said register relays, and said counting relays are limited to a total of sixteen relays to provide a total of thirty-six two-digit code signals.

21. A code call circuit as in claim 18, wherein said interrupter consists of only two relays, said sequence relays of only three relays, said tens and units registers of three relays each, and said counting relays of four relays, to provide a total of thirty-six two-digit code signals, to be repeated indefinitely.

22. In an automatic branch exchange telephone system comprising local lines and trunks, local links for establishing local connections, finder and connector switches for each link and a trunk switch for each trunk, means for connecting any one of said lines to any one of said trunks via the associated trunk switch, means responsive to a momentary interruption in said line during said connection for causing said trunk to operate the finder switch of an idle link to connect said line to said link via said trunk switch and said finder switch, pulse receiving means for said link operated responsive to impulses received thereby over said last connection for operating the connector of said link to complete a consultation call from said first line to a second local line via said trunk and finder and connector switches, means responsive to a second momentary interruption in said first line for returning said first line to said trunk connection via said trunk switch, and means for then switching said first line alternately back and forth at will between said consultation connection and said trunk connection by similar momentary interruptions in said first line.

23. In an automatic branch exchange telephone system comprising local lines and trunks, local links for establishing local connections, crossbar finder and connector switches for each link and a crossbar trunk switch for each trunk, tens and units magnets for said switches, means for connecting any one of said lines to any one of said trunks via the associated trunk switch, means responsive to a momentary control signal exercised over said trunk-connected line for causing said trunk to operate tens and units magnets corresponding to said trunk in the finder of an idle link to connect said line to said link via said trunk switch and said finder, pulse receiving means associated with said link, means responsive to impulses received thereby over said last connection for operating tens and units magnets in the connector of said link to complete a consultation call from said first line to a second local line via said trunk switch and said link, means responsive to a second momentary control signal exercised over said first line for returning said first line to said trunk connection through said trunk switch, and means for returning to said consultation call and back again to said trunk call responsive to a third and a fourth momentary control signal exercised over said first line.

24. In an automatic branch exchange telephone system comprising local lines and trunks, local links for establishing local connections, finder and connector switches for each link and a trunk switch for each trunk, means responsive to the initiation of a call on any line for connecting said line to an idle link via the associated finder, pulse receiving means associated with said link operated responsive to impulses representing a common trunk call number received thereby over said connection for causing the trunk switch of an idle trunk to connect said line to said trunk, said link thereupon releasing, means in said trunk operated responsive to a momentary signal from said connected line to connect said line to an idle link via the finder thereof and said trunk switch, means including said pulse receiving means operated responsive to impulses received thereby over said last connection to cause said link to extend said last connection to a second local line for a consultation call via the connector of said link, trunk seizing means for said link, a restriction relay for said link for disabling said trunk seizing means, means for operating said relay from certain local lines responsive to the seizure of a link thereby at the initiation of a call from such line, and means for operating said relay from said connected trunk when said link is seized thereby for a consultation call originating from any line.

25. A telephone system as in claim 24, wherein said finder switches, said connector switches, and said trunk switches are crossbar switches, and said restriction relay is operated by way of a fourth conductor switching means in said finders, in addition to the usual line and test conductor switching means.

26. Equipment for use in an automatic branch exchange telephone system comprising local lines and trunks, local links for establishing local connections, crossbar finder and connector switches for each link, a crossbar trunk switch for each trunk, tens and units magnets for said switches, link associated means for connecting any one of said lines to any one of said trunks via the associated trunk switch, means operated responsive to a momentary control signal exercised over said trunk-connected line for causing said one trunk to operate tens and units magnets corresponding to said trunk in the finder of an idle link to connect said line to said link via said trunk switch and said finder, pulse receiving means associated with said link operated responsive to impulses representing the call number of a second local line received thereby over said last connection for operating tens and units magnets corresponding to said second line in said link's connector to complete a consultation call through said trunk switch and said link, means responsive to a second momentary signal for returning said first line to said trunk connection, a restriction relay associated with said link for disabling said link trunk connecting means, and means for operating said relay responsive to seizure of said link via a trunk for a consultation call.

No references cited.